United States Patent
Burn

(10) Patent No.: US 8,813,508 B2
(45) Date of Patent: Aug. 26, 2014

(54) TRAY-BASED CONTINUOUS THROUGHPUT BLAST FREEZER

(76) Inventor: Mark Burn, Port Townsend, WA (US)

(*) Notice: Subject to any disclaimer, the term of this patent is extended or adjusted under 35 U.S.C. 154(b) by 1064 days.

(21) Appl. No.: 11/784,349

(22) Filed: Apr. 6, 2007

(65) Prior Publication Data

US 2008/0245078 A1 Oct. 9, 2008

(51) Int. Cl.
- *B65B 63/08* (2006.01)
- *F25D 13/06* (2006.01)
- *F25D 25/04* (2006.01)
- *F25D 3/12* (2006.01)

(52) U.S. Cl.
USPC ......... 62/60; 62/63; 62/382; 62/380; 62/378; 62/345

(58) Field of Classification Search
USPC ................. 62/60, 63, 382, 380, 378, 345
See application file for complete search history.

(56) References Cited

U.S. PATENT DOCUMENTS

| | | | |
|---|---|---|---|
| 2,474,069 A | 6/1949 | Silvera | 62/102 |
| 3,233,425 A | 2/1966 | Grugel | 62/382 |
| 3,304,689 A * | 2/1967 | Reichel | 53/512 |
| 3,688,518 A | 9/1972 | Goltsos et al. | 62/374 |
| 3,696,631 A | 10/1972 | Valdes | 62/282 |
| 3,952,540 A | 4/1976 | Okada et al. | 62/374 |
| 3,993,189 A | 11/1976 | Khoylian et al. | 198/464.3 |
| RE29,477 E * | 11/1977 | Wight | 62/266 |
| 4,157,018 A | 6/1979 | Goltsos | 62/373 |
| 4,157,650 A | 6/1979 | Guibert | 62/374 |
| 4,164,129 A | 8/1979 | Stueber | 62/326 |
| 4,196,802 A | 4/1980 | Lorentzen | 198/465.3 |
| 4,284,188 A | 8/1981 | Gram | 198/465.3 |

(Continued)

FOREIGN PATENT DOCUMENTS

| | | | |
|---|---|---|---|
| GB | 1369093 | 2/1974 | ............. F25D 25/04 |
| WO | WO2005037689 | 4/2005 | |

OTHER PUBLICATIONS

International Search Report and Written Opinion mailed Jun. 1, 2009 in PCT/US08/03156 filed Mar. 10, 2008.

(Continued)

*Primary Examiner* — Judy Swann
*Assistant Examiner* — Ian Soule
(74) *Attorney, Agent, or Firm* — McDonnell Boehnen Hulbert & Berghoff LLP

(57) ABSTRACT

A high capacity, continuous production blast freezer includes an insulated enclosure, a refrigeration system supplying cold air to the enclosure and a plurality of trays containing comestibles to be frozen. A tray advancement or pusher mechanism advances a first tray into the enclosure and then advances a second tray into the enclosure, pushing the first tray further into the enclosure. Gradually a first level of the enclosure is filled with trays. An elevator mechanism at both ends of the enclosure allows the trays reaching the end of the enclosure to advance to a second level, and the tray advancement mechanism advances the tray out of the elevator onto the second level. Eventually, as additional trays are pushed into the enclosure, the second level and then optionally further levels of the enclosure are filled with trays. After the enclosure is completely filled with trays, for every tray entering the enclosure a tray exits carrying frozen comestibles, resulting in continuous production of frozen comestibles. The trays travel back and forth through the insulated enclosure on a passive tray guide in the form of rails, rollers or other device, preferably without requiring a conveyor or other active electromechanical tray transport system inside the enclosure.

18 Claims, 15 Drawing Sheets

(56) References Cited

U.S. PATENT DOCUMENTS

| | | | |
|---|---|---|---|
| 4,329,850 A | 5/1982 | Drummond | 62/63 |
| 4,378,873 A | 4/1983 | Cloudy | |
| 4,912,943 A | 4/1990 | Hubert et al. | 62/374 |
| 4,955,209 A | 9/1990 | Smith | 62/380 |
| 5,205,135 A | 4/1993 | Lang | 62/381 |
| 5,320,210 A * | 6/1994 | Van Den Bergh et al. | 198/465.1 |
| 5,343,715 A | 9/1994 | Lang | 62/381 |
| 5,452,588 A | 9/1995 | Onodera | 62/381 |
| 5,520,013 A * | 5/1996 | Kuo | 62/380 |
| 6,009,719 A | 1/2000 | Ochs | 62/380 |
| 6,235,332 B1 | 5/2001 | Arnason | 426/524 |
| 6,796,142 B2 | 9/2004 | Burn | 62/380 |
| 2003/0041614 A1 * | 3/2003 | Burn | 62/380 |

OTHER PUBLICATIONS

European Patent Application No. 08726653.2, Extended European Search Report (supplementary European search report and European search opinion), mailed Jul. 9, 2013.

International Preliminary Report on Patentability mailed Nov. 26, 2009 in PCT/US2008/003156, filed Mar. 10, 2008.

* cited by examiner

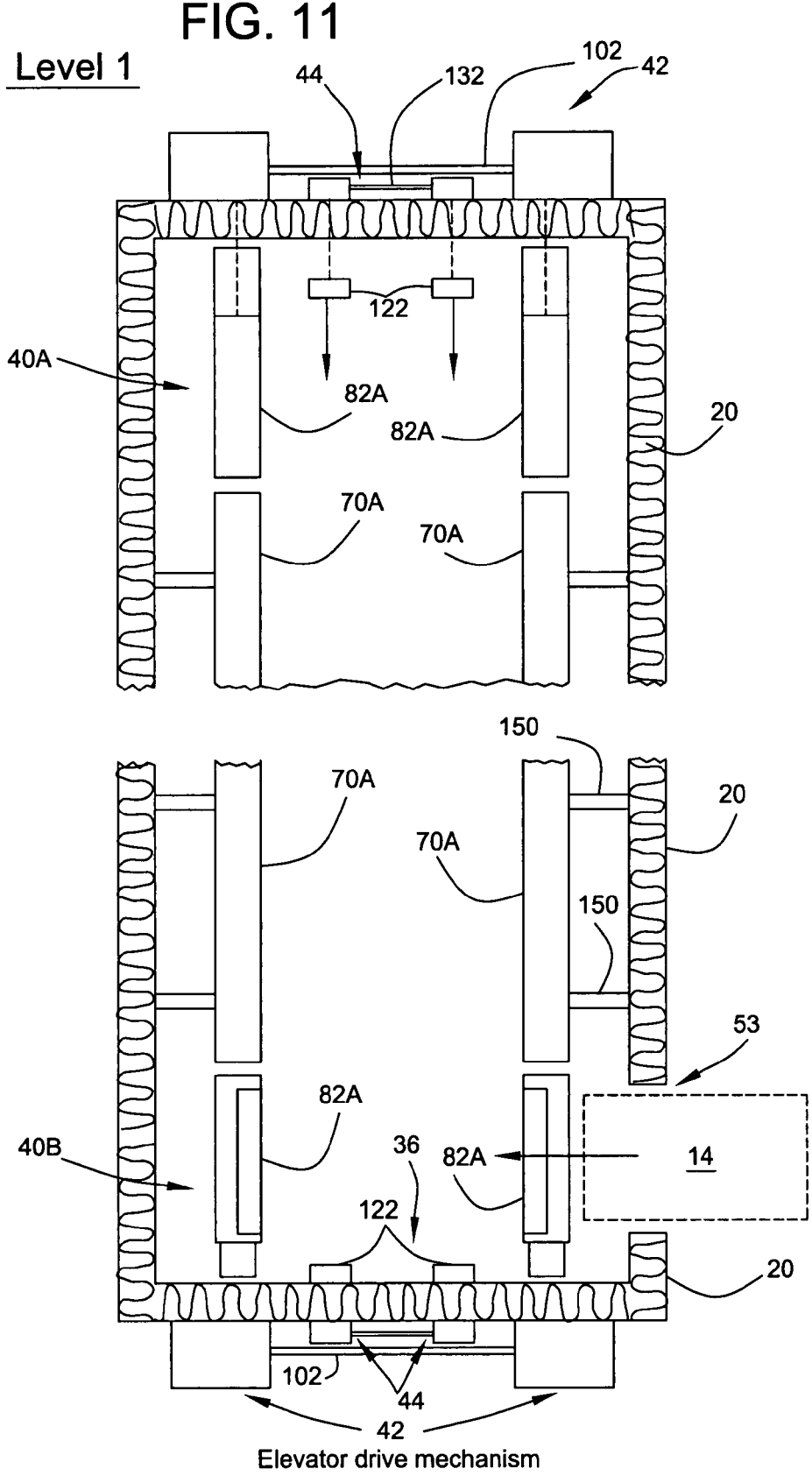

Top Level FIG. 12
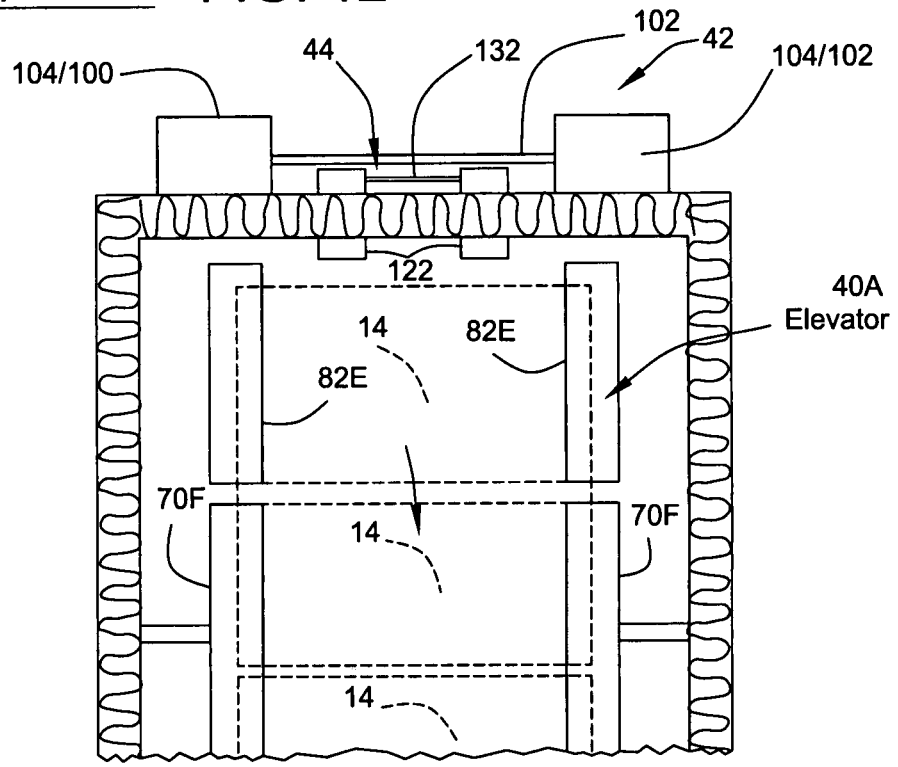
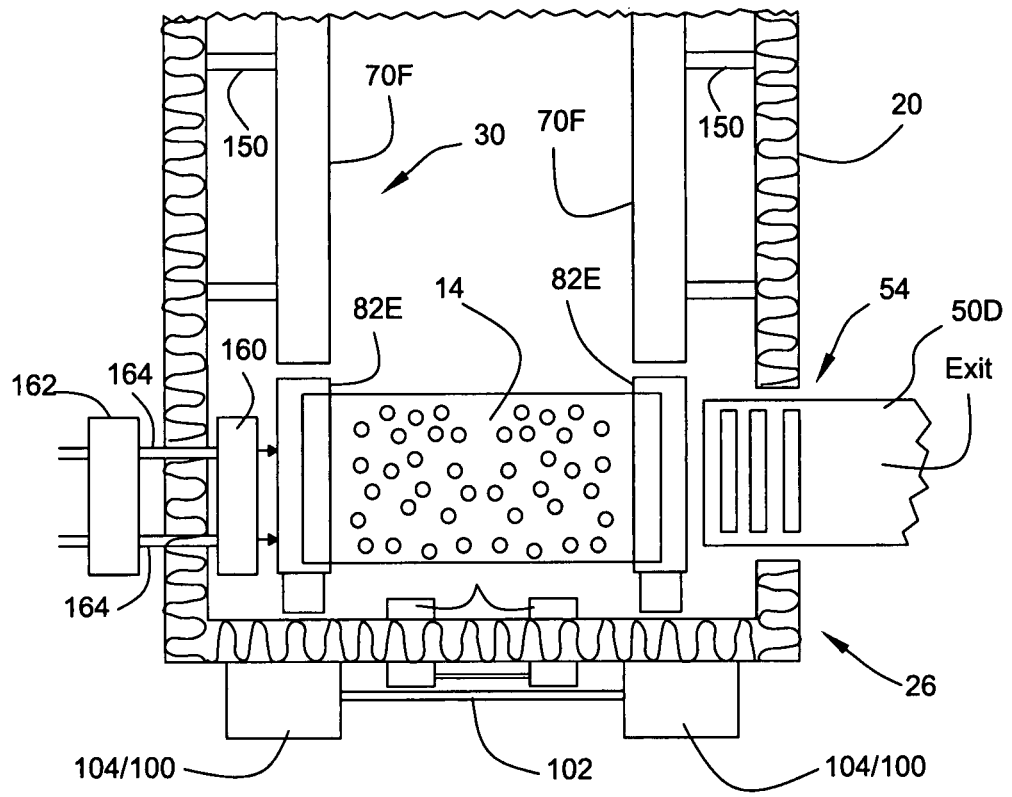

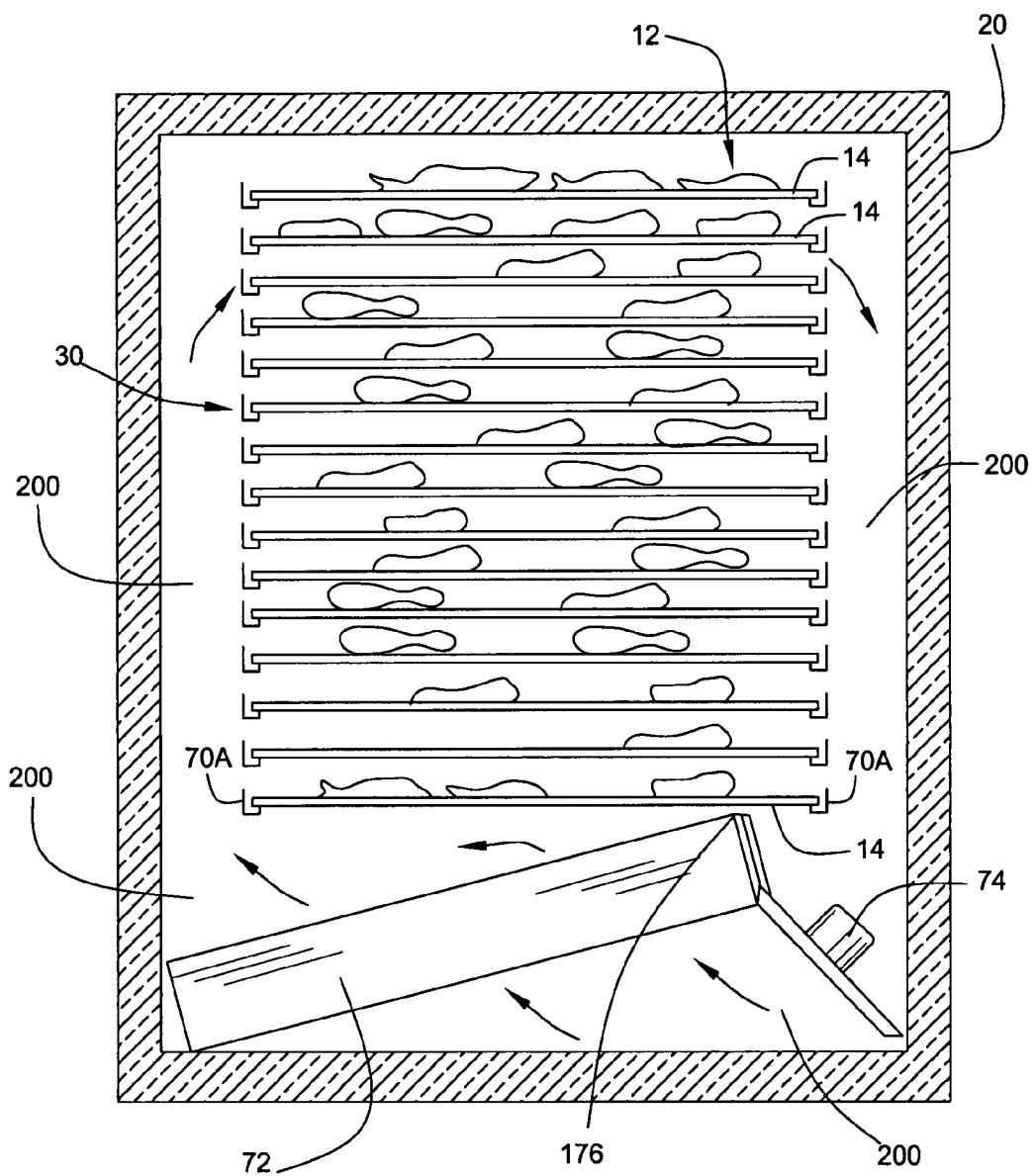

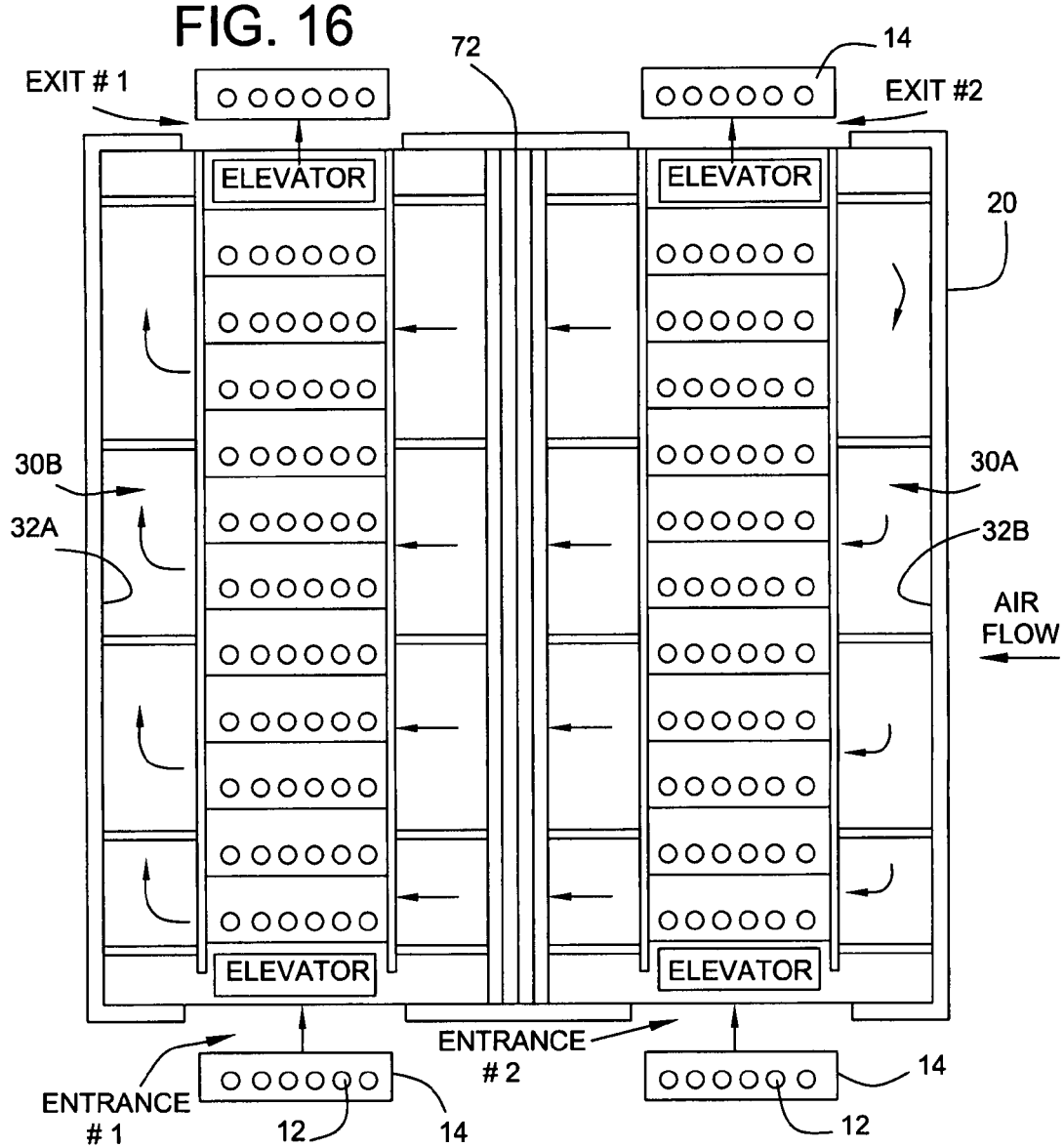
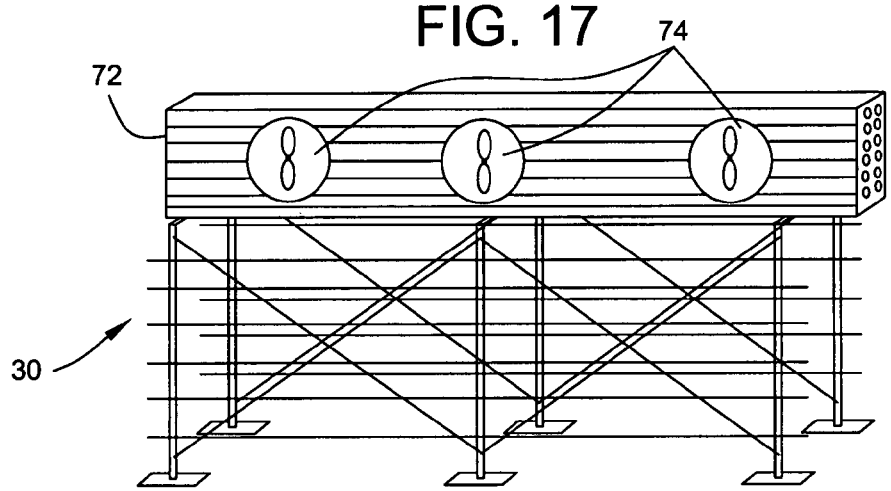

TRAY-BASED CONTINUOUS THROUGHPUT BLAST FREEZER

BACKGROUND OF THE INVENTION

A. Field of the Invention

This invention relates generally to industrial and commercial blast freezing systems for comestibles such as meat, seafood, vegetables and baked products. In particular, the invention relates to a blast freezer system designed for continuous production and which achieves a high throughput of product with a minimum of labor. The freezer system can be either fixed or portable. Some embodiments described below are particularly suited for installation on fishing boats or in remote processing locations, but the invention is applicable to freezing systems in general.

B. Description of Related Art

Many methods are commonly used for preserving foodstuffs, including canning, salting, drying, retort pouching, smoking and freezing. However, all of these methods substantially alter the taste and texture of the preserved foodstuff that typify freshness, except freezing. Freezing can maintain the freshness of food, medical specimens and other items for extended periods of time and can be considered the preferred method of long term preservation for almost all foodstuffs, particularly seafood, meat, fruit and vegetables as well as baked goods. Blast freezing systems are known which are designed for freezing large quantities of comestibles such as meats, seafood, vegetables and bakery products, in a relatively short amount of time. Such systems work by subjecting the comestibles to air, moving at high velocity, chilled to very low temperatures, such as –40 degrees F., for a period of time sufficient to completely freeze the product.

The process of freezing unavoidably changes the food product chemically, biologically and physically. The magnitude of these changes, and the resulting quality of the frozen food product, is greatly affected by many factors, including the rate, method and temperature of the freezing process, and the temperature and air velocity during freezing and storage. Generally speaking, it is accepted that fast freezing rates and low consistent storage temperatures are necessary for high quality in most frozen food products. Fast freezing rates create smaller ice crystal formation and less migration of compounds that remain soluble during the freezing process, which greatly affects the taste and texture of the resulting frozen product. Depending on the type of foodstuff, some compounds continue to migrate after the product is considered frozen, further altering the taste and texture. Although recommended storage temperature very for different products, consistent low temperatures of –20° F. to –40° F. or lower reduce this migration to nil and are considered necessary for the high quality long term storage of most frozen food. So-called blast freezing systems have been developed to freeze foodstuffs at these temperatures quickly.

Another factor that greatly affects the quality of frozen foodstuff and other items is the elapsed time between harvesting and freezing. Most products, particularly seafood, begin to deteriorate rapidly after harvest, resulting in altered taste and texture making them less desirable in the market place. Fishing vessels, in order to sell to more particular markets and to stay on the fishing ground until full, must have suitable production equipment on board for freezing while at sea. Likewise, agricultural organizations must have production freezing equipment nearby, reducing the time between harvest and processing making the resulting product suitable for the more desirable markets that expect high quality frozen foods.

Freezing methods and systems are described in U.S. Pat. Nos. 6,235,332, 4,164,129, 5,452,588, 3,696,631, and 4,164,129. A ship-board freezing system is set forth in U.S. Pat. No. 3,696,631. This patent relates to brine freezing onboard a fishing vessel, specifically a deck mounted brine freezing apparatus and integral hold refrigeration system. Brine freezing is often used for shrimp and other similar product and is accomplished at warmer temperatures than desirable for many other freezing applications. While the system of the '631 patent may be well suited for its intended purpose of brine freezing shrimp, it is not suited for broad use on a variety of different comestibles. Other prior art of interest includes British patent GB 1,369,093 and U.S. Pat. No. 6,009,719. My prior U.S. Pat. No. 6,796,142 discloses a continuous throughput blast freezer system which overcomes many of the limitations of the above prior art. The entire content of my prior '142 patent is incorporated by reference herein.

The world-wide expansion and globalization of food producing entities has greatly increased the need for versatile production freezing equipment that can produce very high quality products, suitable for installation onboard fishing vessels, processing vessels and land based installations in remote areas of the world, as well as more conventional plant locations near industrial centers. Another desirable feature is for the freezing system to be containerized and or modular, suitable for manufacturing complete or near complete at the factory enabling easy shipment and commissioning at a remote site. Another desirable feature is for the freezing system to be portable, suitable for moving to new areas as individual fish run seasons are completed, or the harvest of one crop is completed and the freezing capacity is needed elsewhere. Production freezing equipment represents a major investment for most organizations and is therefore important for the equipment to be versatile and suitable for a wide variety of products.

This invention relates to an improved continuous throughput blast freezer system which provides still further improvements and efficiencies over the known prior art. While some of the features of the preferred embodiment are specifically designed and adapted for use in a mobile, i.e., portable, freezer application, others features of the disclosed embodiments are capable of employment in freezer systems generally, as will be apparent from the following discussion. One advantage of the system of this disclosure is that it provides a compact arrangement for freezing large amounts of comestibles, for example as compared to so-called "spiral" freezers such as shown in U.S. Pat. No. 4,164,129.

SUMMARY OF THE INVENTION

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements.

In a first aspect, a freezing system for continuous production of frozen comestibles is disclosed which includes a plurality of trays for carrying comestibles to be frozen. The term "tray" refers to independent, passive support units for carrying product in a horizontal configuration and could take the form of a conventional tray or a basket, or other configuration generally designed for supporting product to be frozen. The system also includes an insulated enclosure or freezer cell having a first end and a second end, an entrance for receiving the trays into the enclosure, and an exit for output of trays from the enclosure carrying frozen comestibles. The enclosure further includes tray guides for receiving the trays and defining a multitude of levels for travel of trays through the enclosure between the first and second ends. The trays are advanced through the enclosure along the tray guides in an abutted relationship, preferably immediately next to each other. The tray guides may take the form of rails or rollers or other appropriate structure.

The system further includes a refrigeration system for providing cold air to the enclosure to thereby freeze the comestibles. The refrigeration system could be external to the enclosure or more preferably includes an evaporator and fans placed within the enclosure, e.g., above, below or to the side of the trays.

The system further includes a tray advancement mechanism for advancing successive trays into the entrance opening to thereby fill a first level of the enclosure with trays in an abutted relationship and for advancing trays along each of the levels in the multitude of levels. In one example, the tray advancement mechanism takes the form of a pusher mechanism which engages a tray and inserts it into the enclosure.

The system further includes an elevator mechanism at each of the first and second ends of the enclosure. The elevator mechanism receives a tray and then lifts (or possibly lowers) the tray to an adjacent level. The tray advancement mechanism operates to move the trays off the elevator onto the level at which the elevator is located.

The elevator mechanism and the tray advancement mechanism operate in a synchronized manner such that additional trays are advanced into the entrance after filling of the first level to thereby successively fill the second and remaining levels in the multitude of levels of the enclosure until the tray guides are filled with trays, i.e., the enclosure is filled up. Thereafter, the freezer system continues to receive additional trays. For every tray advanced into the entrance a tray exits the exit carrying frozen comestibles, thereby providing a continuous production of frozen comestibles. The tray entrance and tray exit does not have to be simultaneous, however it could be depending on the system configuration.

In a representative embodiment, the system operates as follows. A tray loaded with product is positioned to engage with and slide along the tray guides at the entrance to the freezer, and the tray advancement mechanism pushes it one tray width into the freezer. The second loaded tray is pushed into the enclosure similar to the first tray where the leading side of the second tray pushes against the first tray moving it one tray width further along the tray guide to "position two". This operation is repeated until the entire first level has been filled with trays carrying product to be frozen. The first tray into the freezer is moved in this fashion into the first elevator mechanism at the end of the freezer. The first elevator then moves up to align the first tray with the second level of the tray guides whereupon it is pushed off the elevator onto the second level. The elevator than returns to its original (e.g., lower) position and the operation is repeated until the second level is completely loaded with trays. In a system with three or more levels, after traversing the length of the enclosure along the second level the first tray (and successive trays) is moved onto a second elevator at the opposite end where that tray is moved up to and in alignment with the third level of the tray guides. The tray is than pushed off the elevator onto the third level. The process repeats until the third level is also completely filled. The elevators are timed so that when the second elevator is in the up position the first elevator is in the down position where it simultaneously receives a tray from the third rail as it is also receiving a tray from the first rail, then moves up to align its lower two rails loaded with trays with the second and forth levels. The process repeats itself until all the levels are full. For every new tray loaded with product that enters the freezer a product tray exits the freezer, possibly but not necessarily at the same time, resulting in continuous production of frozen comestibles. The entrance and exits can be at the same end of the enclosure or at opposite ends. Further, the freezer enclosure can have the entrance either at the end faces of the enclosure or in the sides.

The freezing system can be either fixed or portable. In a portable embodiment, the enclosure can take the form of a modified shipping container.

The freezing system is suitable for freezing a variety of comestibles, including baked goods, vegetables, meats, and in particular sea foods such as fish, prawns, shrimp, crab, or other products. The structures attaching the tray guides to the enclosure can be constructed so as to be adjustable such that the height between the different levels is changeable to accommodate different products or types of products having differing thickness or height.

The freezing system provides continuous throughput of individual product freezing trays which become independent of the freezer once they exit the freezer. After exiting the freezer enclosure, the trays can be routed in a closed loop to an unloading station, a cleaning station, a product loading station, and back into the freezer, in a manner which is convenient to product flow and human ergonomics. Trays can also be accumulated along a moving belt either upstream or downstream of the freezer, providing the benefits of a belt without the encumbrances of routing a belt through a freezer.

A typical freezing system may utilize perhaps 200-300 trays (depending on the size of the trays and the size of the freezer enclosure), with a tray of new product to be frozen entering the freezer every 15-60 seconds depending on the dwell time needed to freeze a particular product. In an example embodiment, with a 30 second tray insert interval and each tray carrying 50 pounds of product, the freezer has a capacity of 6,000 pounds per hour or 120,000 pounds per day with a 20 hour per day duty cycle. Improved product density, freezer capacity and optimized air flow to accomplish optimal freezing is accomplished by adjusting vertically the tray guide spacing.

Trolleys and return tracks for carrying trolleys from the exit to the entrance, as disclosed in my prior U.S. Pat. No. 6,796,142, and in other prior art freezing systems, are not necessarily needed or used in the illustrated embodiments. Furthermore, as the enclosure preferably includes only passive means to carry the trays along the levels such as guide rails or rollers, and in such embodiments there is no need for drive chains, conveyor belts or other "active" transport system within the freezer. This eliminates problems with chain timing and lubrication, and eliminates wasted space to accommodate a belt return as in many prior systems. Less preferred embodiments could use belt or similar systems for guiding and advancing trays within the enclosure, either in whole or in part.

The refrigeration system can take advantage of many of the features of the cooling systems for continuous throughput blast freezers disclosed in my prior U.S. Pat. No. 6,796,142, such as the design of the evaporators, the placement of the evaporators within the enclosure, flow of air in a direction transverse to the direction of travel of the trays, and still others.

In another aspect, a method for continuous production of frozen comestibles is disclosed, comprising the steps of:

successively advancing trays carrying comestibles to be frozen into an insulated enclosure at an entrance located at an entrance end thereof such that a first level of the enclosure extending from the entrance to an opposite end of the enclosure is filled with trays in an abutted relationship;

advancing a tray from the first level at the opposite end from the entrance end onto an elevator mechanism and advancing a further tray into the entrance;

carrying the tray advanced onto the elevator to an adjacent second level of the enclosure extending between entrance end and the opposite second end;

continuing to advance trays into the entrance, operating the elevator and advancing trays along both the first and second levels to fill the first and second levels of the enclosure with trays in an abutted relationship;

continuing to advance trays into the entrance, operating the elevator and a second elevator mechanism proximate to the entrance end and advancing trays along the first and second levels and successive levels of the enclosure until all the levels in the enclosure are filled with trays in an abutted relationship; and thereafter continuing to advance a tray into the entrance and withdrawing a tray carrying frozen comestibles from an exit of the enclosure to thereby provide a continuous production of frozen comestibles.

In another aspect, a freezing system for continuous production of frozen comestibles carried on trays is disclosed. The system includes an insulated enclosure having a first end and a second end, and tray guides positioned within the enclosure receiving the trays and defining two or more levels for travel of trays through the enclosure between the first and second ends in an abutted relationship. The system further includes a refrigeration system providing cold air to the enclosure to thereby freeze the comestibles. A tray advancement mechanism is provided for advancing trays longitudinally along the tray guides in the two or more levels, the trays advanced along the guides in an abutted relationship. One or more elevator mechanisms are provided for advancing trays from one level to another level within the enclosure. In the simplest case with only two levels, only one elevator is required. In an embodiment with three or more levels, at least two elevators will normally be provided. The one or more elevator mechanisms and the tray advancement mechanism operate in a manner such that trays are successively advanced into the enclosure to fill all the levels until the tray guides are completely filled with trays, and wherein thereafter for every tray entering the enclosure a tray exits the enclosure carrying frozen comestibles, thereby providing a continuous production of frozen comestibles.

In yet another aspect, a freezer enclosure for a freezing system is disclosed which includes a superstructure having interior side walls, the superstructure defining a longitudinal axis. A plurality of tray guides are incorporated into the interior of the superstructure and spaced from the side walls. Opposed pairs of the tray guides form a guide for guiding a tray through the interior of the superstructure along the longitudinal axis. The tray guides are provided so as to form a multitude of levels. The tray guides preferably take the form of rails, rollers or other passive device. A first elevator is provided at a first end of the enclosure and a second elevator is provided at a second end of the enclosure. The elevators operate to move the trays from one level to another. A first tray advancement or pusher mechanism is provided at the first end and a second tray advancement or pusher mechanism is provided at the second end of the enclosure. The pusher mechanisms push a tray out of the elevator and onto a level of the tray guides. The freezer enclosure further includes an entrance for trays entering the enclosure and an exit for trays exiting the enclosure.

In one embodiment, the enclosure takes the form of a modified shipping container, allowing the freezer enclosure to be shipped from place to place. In other embodiments the enclosure is fixed.

In still another aspect, a freezer cell is described comprising an insulated enclosure, tray guides mounted within the enclosure defining a plurality of levels for travel of trays, at least one elevator adapted for receiving simultaneously at least two trays at least two levels in the plurality of levels and transporting the at least two trays vertically to adjacent levels in the plurality of levels, and a pusher mechanism for simultaneously pushing the at least two trays out of the elevator onto the tray guides at the adjacent levels.

Is still another aspect, a freezing system is disclosed for freezing comestibles loaded onto product-carrying trays, comprising an insulated enclosure having an entrance for receiving trays carrying product to be frozen into the enclosure and an exit for discharging trays carrying frozen comestibles from the enclosure, passive tray guides within the enclosure defining multiple levels of travel of the trays including at least a first, a second and a third level for travel of trays, the trays sequentially traveling along the guides from the entrance and then along the first, second and third levels within the enclosure and then out the exit; and a refrigeration system providing cold air to the enclosure to thereby freeze the comestibles.

Still another aspect of the invention relates to an insert module for an insulated enclosure of a freezing system, the insulated enclosure having an entrance and an exit for receiving and discharging product-carrying trays, respectively, comprising passive tray guides defining multiple levels of travel of the trays including at least a first, a second and a third level for travel of trays, the trays sequentially traveling along the guides from the entrance and then along the first, second and third levels within the enclosure and then out the exit, wherein the passive tray guides are insertable as a unit into the insulated enclosure.

The freezing system can be constructed to have multiple independent lanes for freezing product. Thus, in another embodiment, a freezing system for freezing comestibles loaded onto product-carrying trays is disclosed having an insulated enclosure having at least first and second entrances for receiving trays carrying product to be frozen into the enclosure and at least first and second exits for discharging trays carrying frozen comestibles from the enclosure. The system further includes passive tray guides within the enclosure defining at least two sets of multiple levels of travel of the trays, each set including at least a first, a second and a third level for travel of trays, the trays sequentially traveling along the guides from the entrances and then along the first, second and third levels within the enclosure and then out the exits; and a refrigeration system providing cold air to the enclosure to thereby freeze the comestibles.

These and still other aspects and feature of the inventive freezer system and methods will be further described in the following detailed description.

BRIEF DESCRIPTION OF THE DRAWINGS

FIG. 11 is a plan view of the first level of the insulated enclosure, showing a tray entering the enclosure, the tray advancement or pusher mechanisms and the elevators at both ends of the enclosure.

FIG. 12 is a plan view of the top level of the insulated enclosure, showing a tray exiting the enclosure, the tray advancement or pusher mechanisms and the elevators at both ends of the enclosure.

FIG. 13 is a view of the interior of the enclosure showing one possible arrangement of an evaporator component of the refrigeration system relative to the trays carrying product; the view is taken in a vertical plane at an arbitrary location within the enclosure between the ends of the enclosure. The details of tray guides and other structure within the enclosure is omitted from FIG. 13 for the sake of clarity of illustration of the air flow features.

FIG. 16 is a plan view of an alternative arrangement of a freezing system showing an insulated enclosure with two entrances, two exits, two sets of tray guides, and a refrigeration system centrally located within the enclosure.

FIG. 17 is a perspective view of an insert module designed to be inserted into a standard insulated shipping container and bolted into place therein, consisting of a tray guide assembly and the evaporator and fan components of the refrigeration system.

DETAILED DESCRIPTION OF REPRESENTATIVE PREFERRED AND ALTERNATIVE EMBODIMENTS

Figure 1:
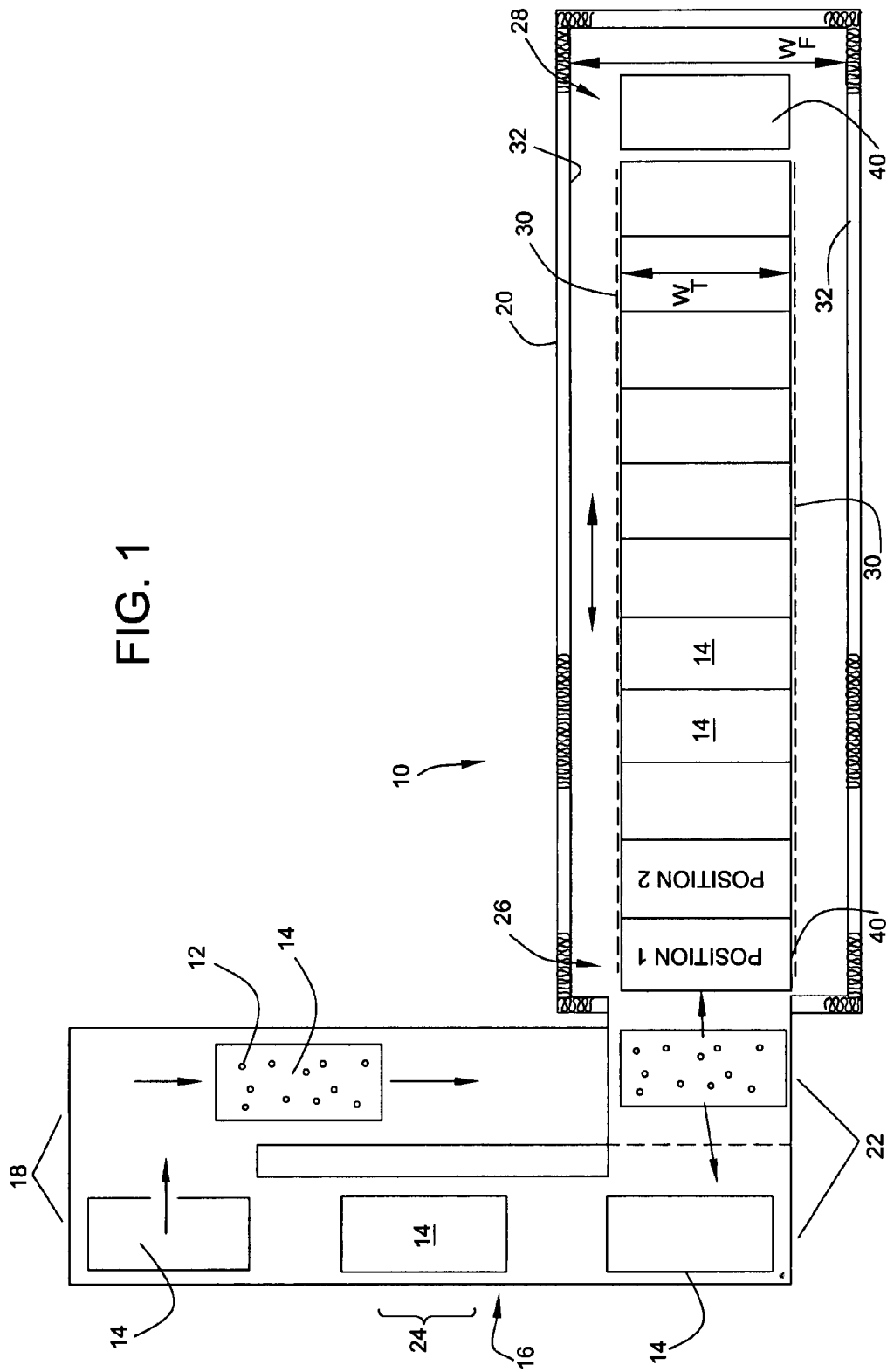
FIG. 1 is a plan view of a tray-based continuous throughput blast freezer system including a system circulation of product carrying trays in a closed loop exterior to the freezer enclosure.

Referring now to FIG. 1, a freezing system 10 is illustrated for continuous production of frozen comestibles 12, such a meats, sea foods such as fish or crab, vegetables, baked goods, dairy products, or other foodstuffs. The system 10 includes a plurality of trays 14 for carrying comestibles to be frozen. The trays 14 are typically made from formed metal, typically aluminum or stainless steel, wire mesh, or other suitable material. The trays could take the form of baskets or other structures for carrying product in a substantially horizontal manner.

The system 10 is shown in conjunction with an external tray conveyor system 16 which circulates the trays 14 in a closed loop. The closed loop includes a product input zone 18 where product is loaded onto the trays 14 and the trays thereafter enter an insulated tunnel-type freezer enclosure 20. The trays circulate through multiple levels of the enclosure as will be described later on and exit and are conveyed to an output zone 22, where product is unloaded from the trays. The trays proceed to an optional tray cleaning zone 24 where the trays 14 are cleaned and then are advanced to the product input zone 18. In this example the trays could be accumulated end to end along a continuously moving belt the speed of which could be synchronized with a product input belt where the product to be frozen would arrive and be loaded on to the trays 14 at the rate matching the freezer production capacity. Loaded trays 14 would than be accelerated while being conveyed to the freezer inlet to gain and allow the typical dwell— then insert cycle of say 15-60 seconds per tray.

The insulated enclosure 20 provides a freezing cell/tunnel or chamber for blast freezing the comestibles 12 carried on the trays 14. The enclosure has a first end 26 and an opposite second end 28, an entrance opening (not shown in FIG. 1) for receiving trays 14 into the enclosure 20 at the first end 26, and an exit opening (not shown in FIG. 1) for output of trays 14 from the enclosure 20 carrying frozen comestibles. In the embodiment of FIG. 1, the entrance opening is positioned below the exit opening at the first end 26, but this could be arranged differently with the entrance at the top and the exit at the bottom.

The enclosure 20 includes tray guides 30 spaced from the interior walls 32 of the enclosure 20 which receive the trays and provide a passive structure for supporting the trays and allowing the trays to be pushed longitudinally through the enclosure 20. The tray guides 30 can take the form of rollers, or more preferably rails having a slot or other structure for receiving a peripheral portion or flange of the tray and carrying the tray by supporting the sides of the trays.

A multitude of tray guides 30 are arranged within the enclosure 20 such that they provide for a multitude of levels for travel of trays through the enclosure between the first and second ends in an abutted relationship. The abutted relationship in shown in FIG. 1, with the trays 14 adjacent to each other. The multitude of levels include at least a first level at which the trays are introduced and advanced along the enclosure and a second level, adjacent to the first level. The second level could be above or below the first level.

Figure 14:
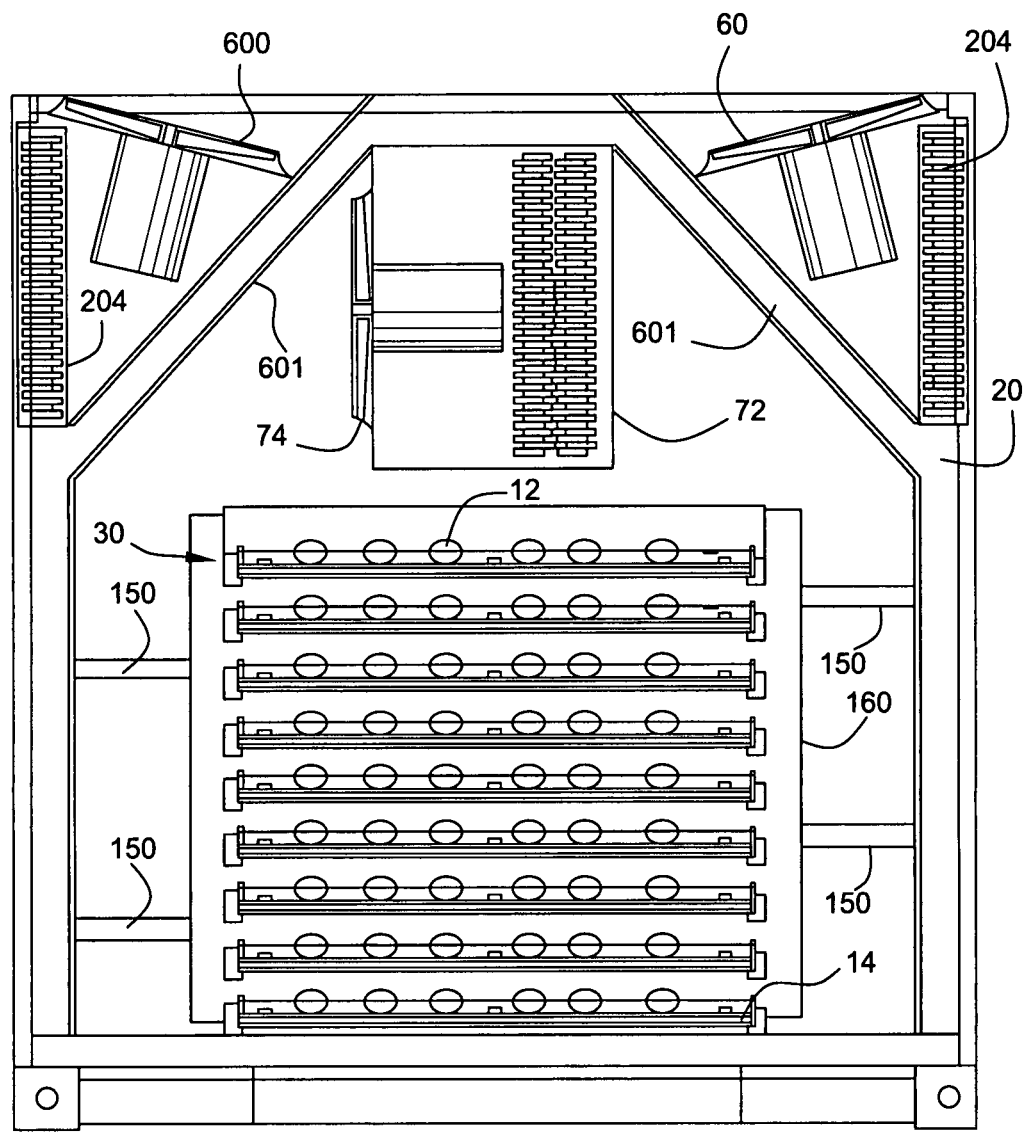
FIG. 14 is a view of the interior of the enclosure showing an alternative possible arrangement of a refrigeration system including evaporator and condenser relative to the trays carrying product; the view is taken in a vertical plane at an arbitrary location within the enclosure between the ends of the enclosure.
Figure 15:
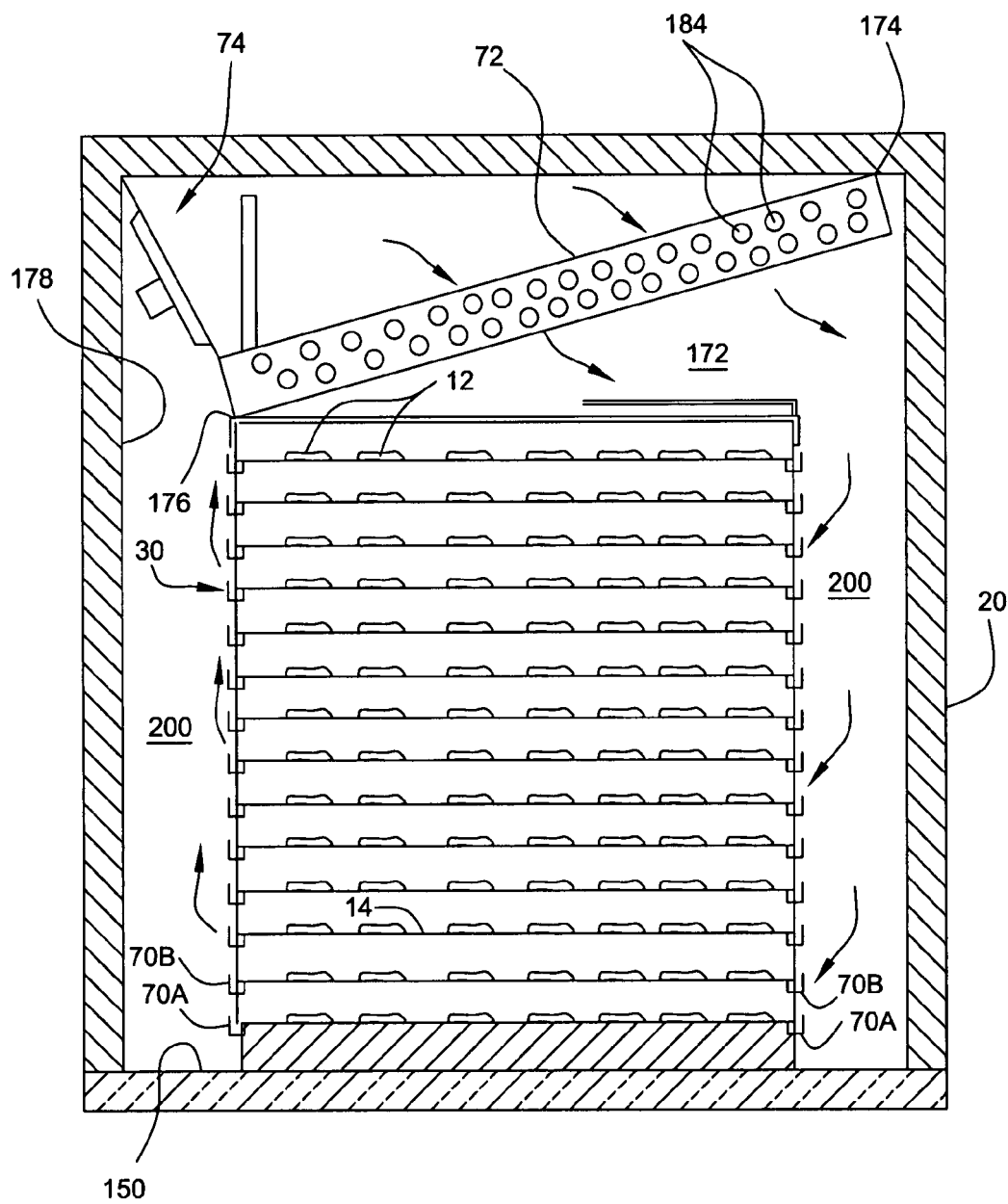
FIG. 15 is a view of the interior of the enclosure showing an additional possible arrangement of a refrigeration system relative to the trays carrying product; the view is taken in a vertical plane at an arbitrary location within the enclosure between the ends of the enclosure.

The system 10 further includes a refrigeration system for providing cold air to the enclosure 20 to thereby freeze the comestibles 12. The refrigeration system may take the form of an evaporator and fans placed within the enclosure such as shown in FIGS. 13-15. The refrigeration system could be external to the enclosure and cold air could be ducted to the enclosure. The details of the refrigeration system are not particularly critical. The refrigeration systems described in my prior patent, including the evaporator designs and air flow considerations, are suitable for use in the freezer system and method of this invention.

The system 10 further includes a tray advancement mechanism 36 (FIGS. 3, 8, 9) for advancing successive trays into the entrance of the enclosure 20 to thereby fill a first level of the enclosure 20 with trays in an abutted relationship. The tray advancement mechanism also functions to advancing trays along each of the levels in the multitude of levels. In one embodiment the tray advancement mechanism consists of a mechanical pusher arrangement which is positioned at both the first and second ends 26 and 28. Examples of a suitable tray advancement mechanism are shown in FIGS. 3, 8, 9, 11 and 12 and will be described subsequently. Variations on the arrangements shown in these figures are certainly possible and the invention is not considered limited to any particular design. Basically, the tray advancement mechanism 36 could consist of any suitable mechanical arrangement which operates to push a tray into the enclosure 20, see "position 1" in FIG. 1. Once a tray 14 is inserted one tray width, the tray advancement mechanism pushes the next tray into the enclosure, with the tray at position 1 advanced to "position 2" and the second tray in position 1. The process repeats until level 1 is filled. The same process is performed with a tray advancement mechanism for the second level to push the trays in the opposite direction from the second end 28 back to the first end 26. In one preferred embodiment, one tray advancement mechanism is provided at the first end 26 for advancing all the trays at odd-numbered levels (levels 1, 3, 5 and so on) simultaneously from first end 26 to second end 28, and a second tray advancement mechanism is provided at the second end 28 for advancing trays at even numbered levels (levels 2, 4, 6 and so on) simultaneously from the second end 28 to the first end. The embodiment of FIGS. 9, 11 and 12 specifically meet this goal.

The freezer system further includes an elevator mechanism 40 at each of the first and second ends 26 and 28 of the enclosure 20. The elevator mechanism receives a tray 14 at a first level and advances the tray to an adjacent level in the multitude of levels. The elevator mechanism will be described in more detail in conjunction with FIGS. 7, 8 and 10-12. The tray advancement mechanism can be coupled to, nested within or made a part of the elevator mechanism or can be a separate mechanical system. In alternative embodiments, there are individual elevator mechanisms for advancing trays from one level to another at each end of the enclosure.

Ideally, the tray advancement mechanism 36 and the elevator mechanism 40 are timed to work in synchrony with each other. In particular, the elevator mechanism 40 and the tray advancement mechanism 36 operate in a manner such that additional trays are advanced into the entrance opening after filling of the first level to thereby successively fill the second and remaining levels in the multitude of levels of the enclosure until the tray guides 30 are completely filled with trays. That is, the freezer is essentially full of trays at all the levels. Thereafter, for every tray entering the entrance opening a tray exits the exit opening carrying frozen comestibles, thereby providing a continuous production of frozen comestibles.

Figure 2:
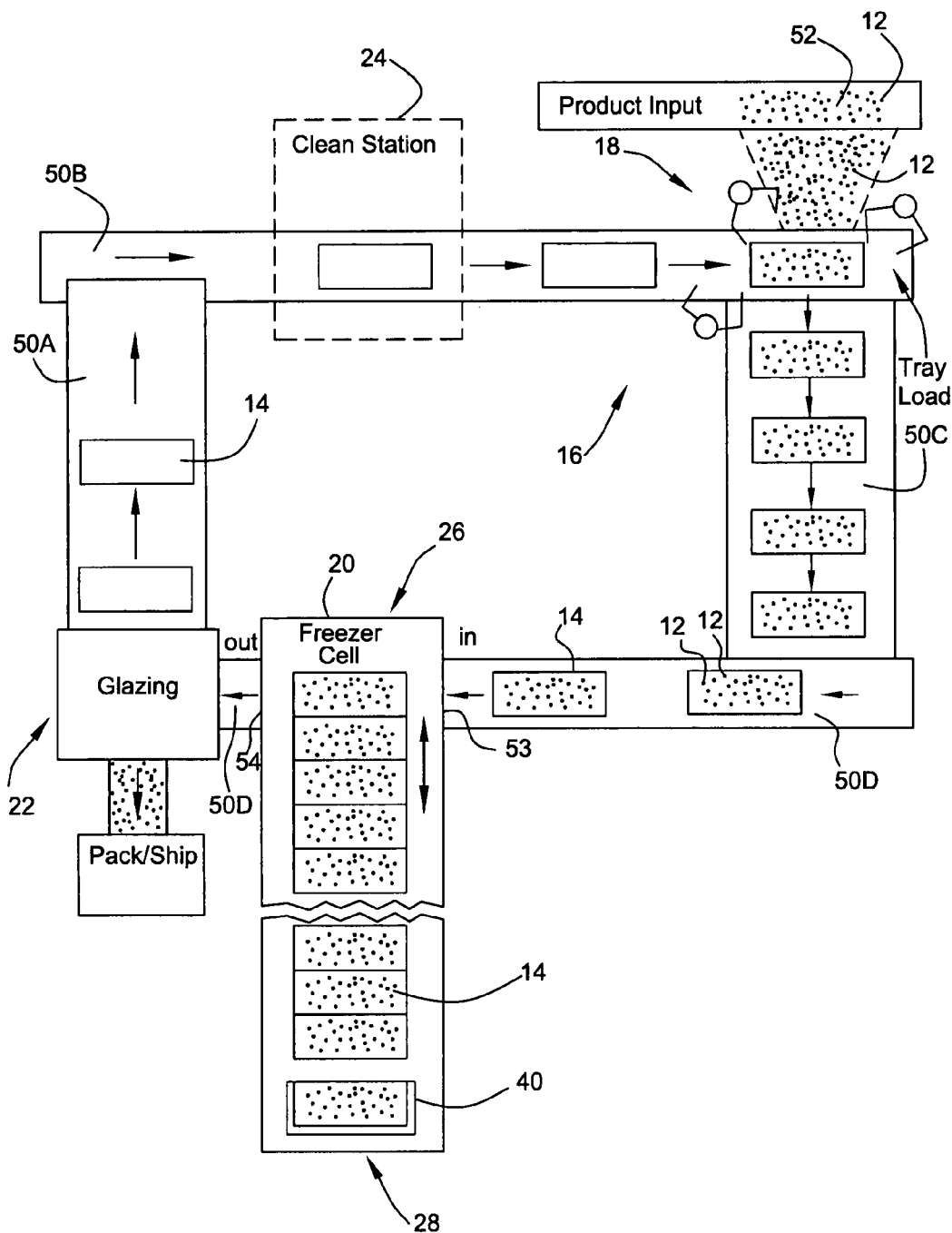
FIG. 2 is a plan view of a tray-based continuous throughput blast freezer system including an alternative arrangement of system for circulation of product carrying trays in a closed loop exterior to the freezer enclosure.

FIG. 2 is a plan view of an alternative arrangement for freezing comestibles 12. The trays 14 are circulated in a closed loop from the freezer cell 20 to an output area 22 where the frozen product is glazed and then moved to a packing or shipping location. The empty trays 14 are moved on a conveyor belt 50A to a second conveyor belt 50B and to a cleaning station 24. The cleaned, empty trays are sent to a product input zone 18 where product supplied along a product input conveyor 52 is transferred onto the trays 14. The trays are advanced along a third conveyor 50C to a loading conveyor 50D which carries the loaded trays with comestibles 12 to be frozen in a timed manner to an inlet or entrance opening 53 in the first end 26 of the freezer cell enclosure 20. After entry into the enclosure 20, the tray advancement mechanism (not shown in FIG. 2) advances the tray one tray width into the enclosure. The next tray is introduced and the first tray is moved to position 2. The first level is gradually filled. One at a time, in synchrony with the advancement of trays into the enclosure, trays are lifted off the end of the first level to the second level and advanced along the second level in the opposite direction from the second end to the first end. The process continues until the second level is filled. Third or higher levels (if present) are filled in the same manner. Eventually, the freezer is filled with trays and the continuous production of frozen comestibles proceeds in a one tray in/one tray out manner as described above. The tray exits the freezer from an exit opening 54 in the enclosure and along the output conveyor 50E to the product unload zone 22.

Figure 3:
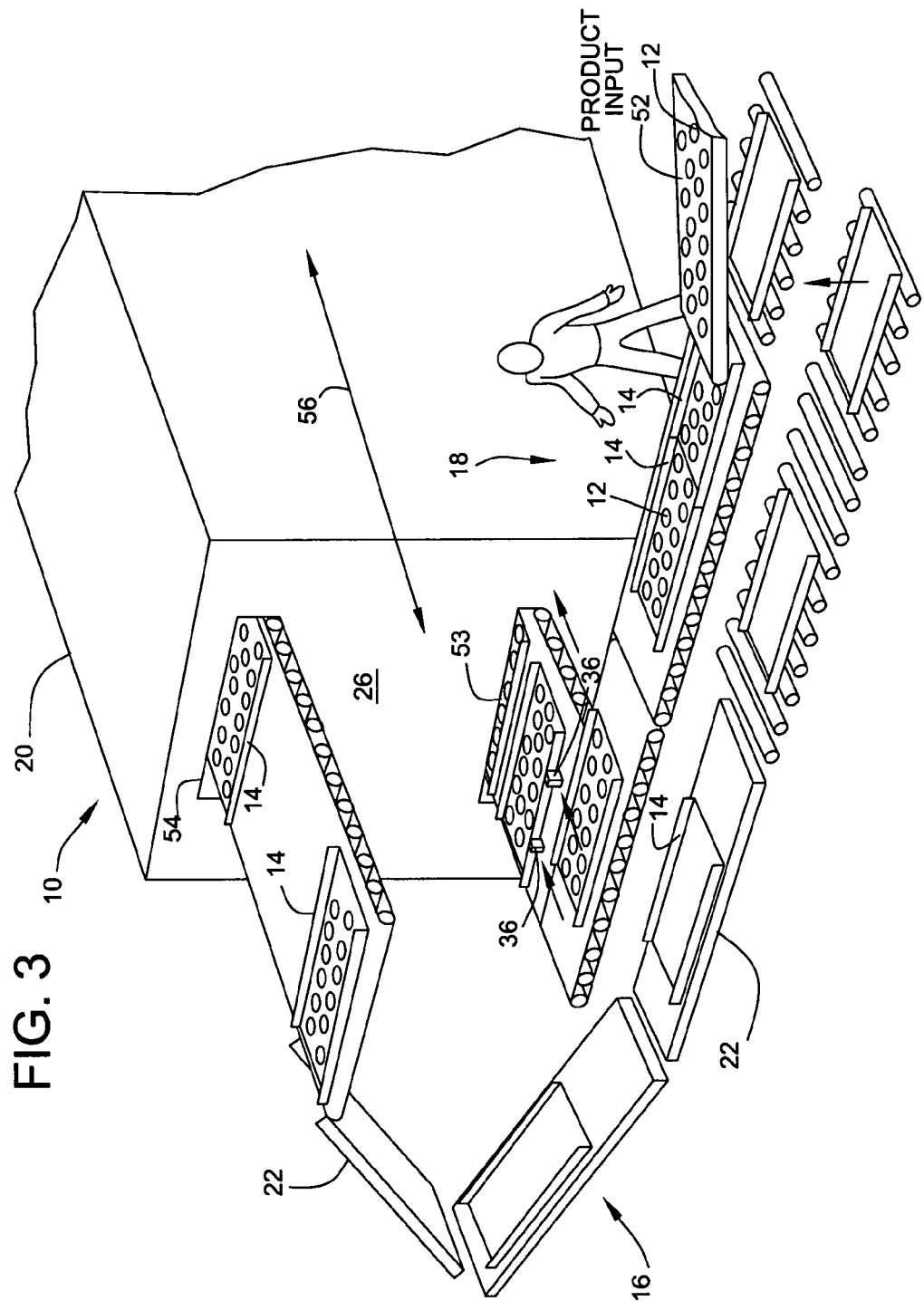
FIG. 3 is a perspective view of tray-based continuous throughput blast freezer system showing product tray entrance and exit locations in a freezing enclosure in the front end of a freezing enclosure. The trays pass under an incoming product belt to receive product and then are advanced into the freezing enclosure.

FIG. 3 is a perspective view of continuous throughput blast freezer system 10 showing product entrance and exit openings 53 and 54 in a freezing enclosure 20 located at the first end 26 of the freezing enclosure 20. Product to be frozen is carried along a conveyor 52 to a tray loading zone 18 the product 12 is conveyed on the trays 14, with or without the aid of workers. The abutted trays pass under the product supply belt or conveyor 52 at a rate as if the trays themselves form a continuous belt, and received product from the conveyor 52. After loading with product, the trays are advanced to the entrance opening 53. The tray advancement mechanism 36 consists of a mechanically driven cog(s) or ram which push the loaded tray into the freezer enclosure 20 where it engages and slides along a guide in the lowest level of multi-leveled tray guide system 30. The tray advancement mechanism 36 pushes the trays 14 into the entrance opening one tray width. The trays move through the enclosure 20 back and forth along a longitudinal axis 56 of the enclosure at successive, multiple levels until they exit the exit opening 54. The trays are then moved to a product unload zone 22 and then to an optional tray cleaning zone 24 and then to the product loading zone 18. The trays may travel on any suitable conveyance outside of the enclosure 20 such as on rollers (as shown in FIG. 3) on a conveyor belt, or both.

Figure 4:
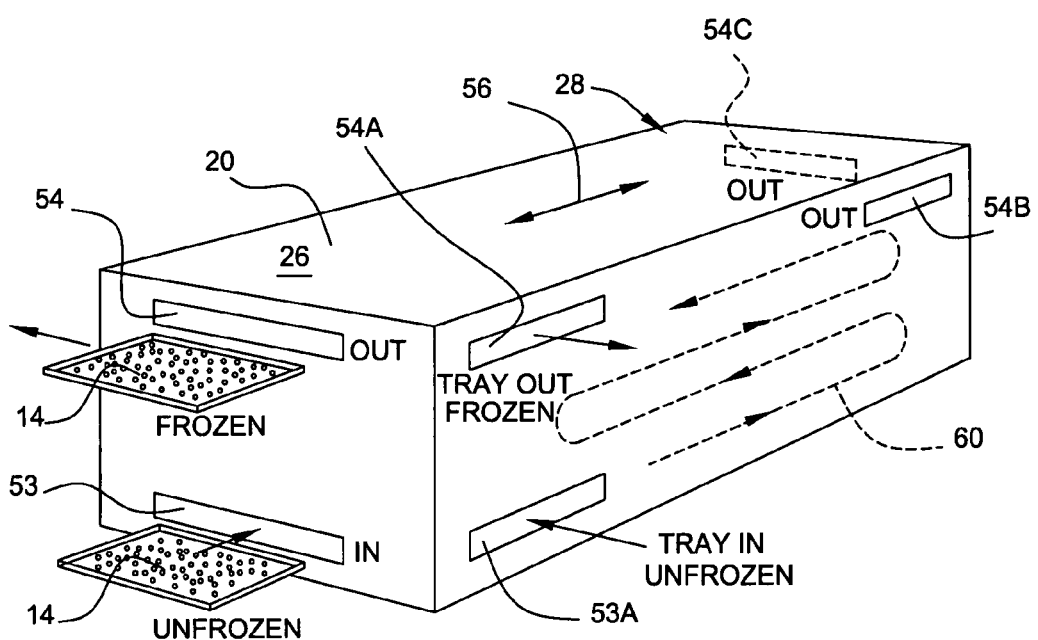
FIG. 4 is a perspective view of the freezer enclosure of the freezing system of FIGS. 1-3 showing alternative possibilities for location of entrance and exit locations in the enclosure and showing the back and forth travel of the trays within the enclosure in dashed lines.

FIG. 4 is a perspective view of the freezer enclosure of the freezing system of FIGS. 1-3 showing alternative possibilities for location of entrance and exit locations in the enclosure and showing the back and forth travel of the trays within the enclosure in dashed lines 60. The entrance 53 can be located at either at the end wall of the enclosure 20 or in the side of the enclosure, as shown at 53A. Likewise, the exit 54 can be either at the end wall or in the side wall, as shown at 54 and 54A. Also, the exit opening 54 can be at the opposite end 28, either in the side wall or in the end wall or at the side as indicated at 54B and 54C. If there are an even number of levels, the entrance and exits will be at the same ends. If there is an odd number of levels, the exit will be located typically at the opposite end, but it could in theory even be placed somewhere in the middle of the enclosure 20.

The number of levels at which the product will travel back and forth between the ends 26 and 28 will be dictated by a number of factors, such as the total length of the enclosure 20, the mass of the individual products to be frozen, the width of the enclosure, the dwell time, the total time required to freeze the product, and still other factors. It is contemplated that for most applications in the fish or meat applications, there will be at least 5 and possibly 10 to 20 levels to the enclosure. The length of the freezer cell for many applications is expected to be between 20 and 45 feet, but for other applications could be longer or shorter depending on available space, production capacity desired, size of product to be frozen, and other factors. The freezer cell can be made from a shipping container modified to provide insulation, tray guides, and a refrigeration system. The width of the trays 14 can also vary, but to maximize capacity of the freezer should have a width $W_T$ which is at least 50 percent of the width $W_F$ of the freezer cell between the interior walls 32 (see FIG. 1). An alternative configuration with a double rail system and two entrances and exits is shown in FIG. 16 and will be described later on.

A typical freezing system 10 may utilize 200-300 trays 14 with a tray 14 of new product to be frozen entering the freezer enclosure 20 every 15-60 seconds, depending on the dwell time needed to freeze a particular product. In an example embodiment, with a tray entering the enclosure every 30 seconds and each tray carrying 50 pounds of product, the freezer has a capacity of 6,000 pounds per hour (50 lbs. per tray×120 trays per hour) or 120,000 pounds per day with a 20 hour per day duty cycle. Deviation from the above parameters may of course be made, such as providing a tray entrance cycle of less than 15 seconds or greater than 60 seconds, depending on the product to be frozen, the design of the external tray conveyor system, total throughput desired, and other factors. With any given design, flexibility in the freezing enclosure for handling different types or sizes of foodstuffs is possible. In particular, the freezing enclosure can provide for optimum product density, freezer capacity and air flow to accomplish optimal freezing adjusting vertically the tray guide spacing, and possibly adding or removing levels available for travel of the trays back and forth through the enclosure, or even altering the configuration of the enclosure (e.g., make it higher, longer, shorter or lower).

Figure 5:
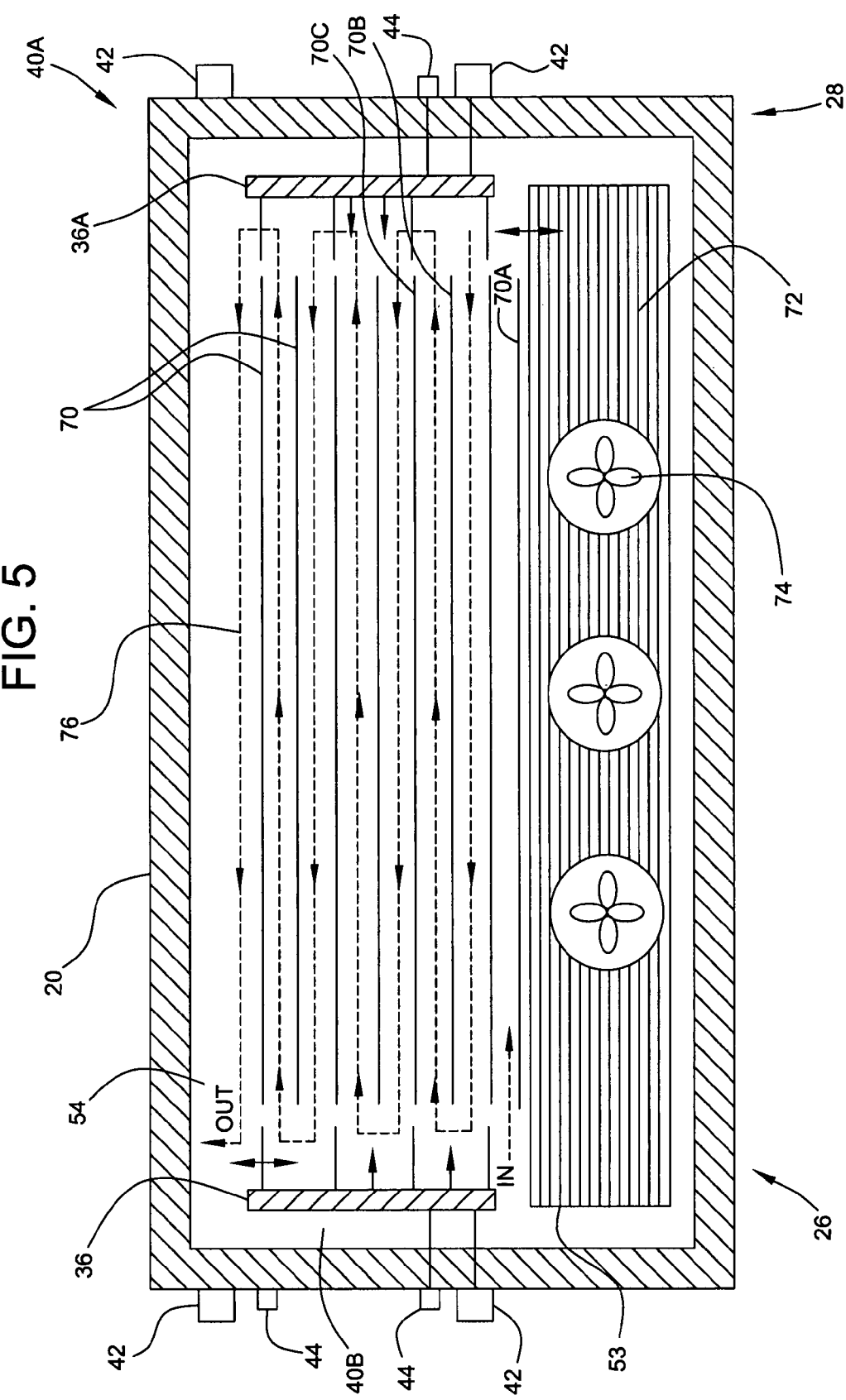
FIG. 5 is a side view, partially in cross section, showing the interior of the freezer enclosure including the multiple levels of tray guides, the elevator mechanisms, and elements of the refrigeration system.

FIG. 5 is a side view, partially in cross section, showing the interior of the freezer enclosure 20 including the multiple levels 70 of the tray guides, the elevators 40, the tray advancement mechanism 36 at both ends 26 and 28, and elements of the refrigeration system including an evaporator 72 and fans 74 positioned below the tray guides arranged to blow air through the enclosure transverse to the direction of travel of the trays through the enclosure, indicated in dashed lines 76. The elevators 40 include a drive system 42 which is preferably positioned exterior to the enclosure 20. The tray advancement mechanism 36 also includes a drive system 44 which is positioned exterior to the enclosure 20. It would in theory be possible to position these drive systems 42 and 44 within the enclosure but that would be less preferred due to issues of long term reliability of operation of the drive systems in a −40° F. environment. The trays are introduced at the entrance location at the lower left, travel to the right along the first level 70A and then are lifted up by the elevator 40A at the second end 28 to the second level (the elevator 40A is shown in its elevated position). The tray advancement mechanism 36A operates to advance the trays off the elevator 40A onto the second level 70B and the trays are one by one pushed along the level 70B to the opposite end of the enclosure, where they are lifted by the elevator 40B to the third level 70C. The elevators 40A and 40B are designed as shown such that they simultaneously receive more than one tray at a time, that is elevator 40A receives trays simultaneously from the odd-numbered levels and simultaneously lifts them to the adjacent even number levels, whereas elevator 40B simultaneously receives trays from the even numbered levels and simultaneously lifts them to the adjacent odd-numbered levels. The tray advancement mechanism 36 consists of a pair of vertical bars or like structure which extend between all the levels and when advanced forward operates to push all the trays which happened to be on the elevators 40A and 40B off the elevator onto the adjacent levels. Independent pushers for each level is another option.

Figure 6:
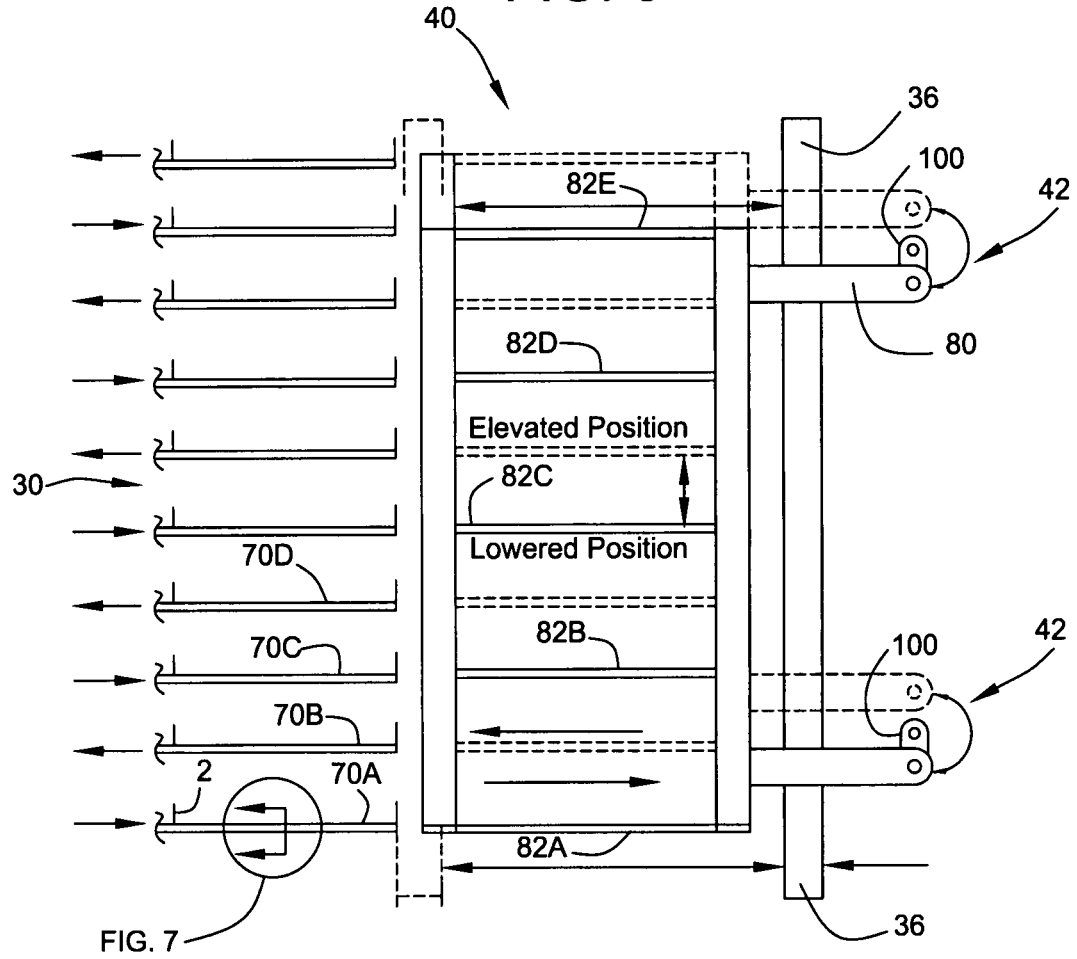
FIG. 6 is a more detailed side view of the elevator mechanism of FIG. 5 which transports the trays from one level to an adjacent level. In a freezer enclosure with three or more levels, there are two elevators positioned at opposite ends of the freezer enclosure, both of which may have the same basic design of FIG. 6.

The structure of the elevator 40 will be more fully understood by reference to FIG. 6, which is a more detailed side view of the elevator 40 of FIG. 5. The elevator includes a frame 80 and a multitude of pairs of tray-receiving rails 82 each of which provide a tray receiving structure for receiving a tray at one of the levels of the enclosure. Five pairs of rails are shown in FIG. 6, consisting of rails 82A, 82B, 82C, 82D and 82E. The rails 82A receive a tray on level 1 70A of the tray guides 30. Rails 82B receive a tray from the third level 70C, and the remaining pairs of rails receive a tray on the further odd-numbered levels. The elevator 40 functions to lift the tray(s) vertically upwards to next adjacent level, at which point the tray advancement mechanism 36 moves forward to move the tray(s) off the elevator onto the tray guides 30. Individual elevators for each set of adjacent rails are another option.

Figure 7:
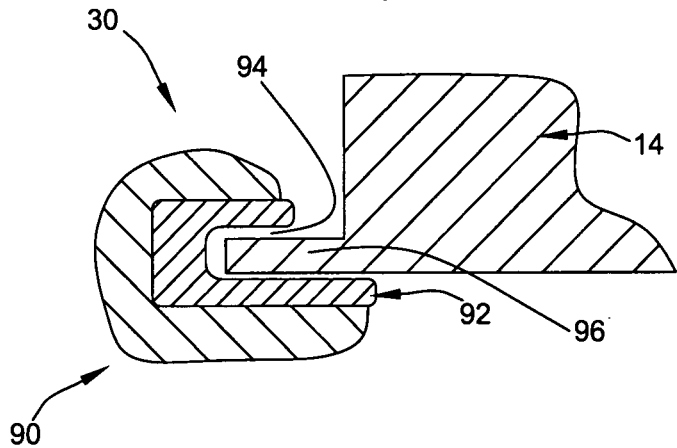
FIG. 7 is a cross-section showing the construction of the tray guide in the form of a rail, having a metal guide portion and a low temperature, low friction component (e.g., UHMW plastic) which receives a peripheral portion or flange of a tray carrying product. The metal guide rail is preferably configured with a profile which has a height which is less than the combined height of the tray and comestibles to be frozen placed on the tray

Referring to FIG. 7, the tray guides 30 defining the multitude of levels in the freezer enclosure 20 can take the form of a rail including a metal, e.g., extruded aluminum guide 90 and an low friction material 92 as ultra high molecular weight (UHMW) plastic which forms a low friction guide or slot 94 which receives a peripheral flange 96 in the tray 14. The guide 30 would effectively contain the tray 14 in both fixed (static) as well as shipboard or other portable applications. The tray guides 30 could also take the form of rollers. The guides are preferably spaced from the interior walls 32 of the enclosure so as to define air plenums allowing air to circulate to the sides of the enclosure, as shown generally in FIGS. 1 and 8.

Referring to FIGS. 3, 5 and 6, after the first tray 14 is inserted into the enclosure 20, when the next tray is loaded it would be pushed in similar to the first where its leading side would also push against the first tray also moving it one tray width farther along the lowest level 70A of the tray guides 30. This operation would be repeated until the entire bottom (or top) rail has been filled with product including. The first rail is aligned with but separate from the first level 82A of the elevator mechanism 40 (FIGS. 6, 10) at the opposite end of the freezer enclosure 20. The first elevator 40A then moves up to align its lower rail 82A now loaded with a product tray 14 with the second rail up (70B) where it is pushed off the elevator 40A onto the second rail 70B by the pusher or tray advancement mechanism 36. The elevator 40 then returns to its original (lower) position and the operation is repeated until the second rail 70B is also completely loaded and a tray has been moved onto the lower rail of a second elevator (40B, FIG. 5) at the opposite end where that tray is moved up to and in alignment with the third rail 70C. The product tray 14 is then pushed off the elevator 40B by a second pusher or tray advancement mechanism 36 associated with the second elevator 40B. The process is repeated until the third rail 70C is also completely filled. The elevators 40A and 40B are timed so that when the second elevator 40B is in the up position the first elevator 40A is in the down position where it simultaneously receives a tray from the third rail 70C as it is also receiving a tray from the first rail 70A, and then moves up to align its lower two rails 82A and 82B loaded with trays with the second and forth rails 70B and 70D. The process repeats itself until the tray guides 30 (rails or rollers) are full. A product tray 14 of frozen product is then pushed out by the pusher 36 out the exit 54 (FIG. 3) where it disengages from the tray guides in the enclosure. In the embodiment of FIG. 3, the exit opening is at the same end as entering product, but it could be at the opposite end depending on the selected configuration, as indicated in FIG. 4.

Figure 8:
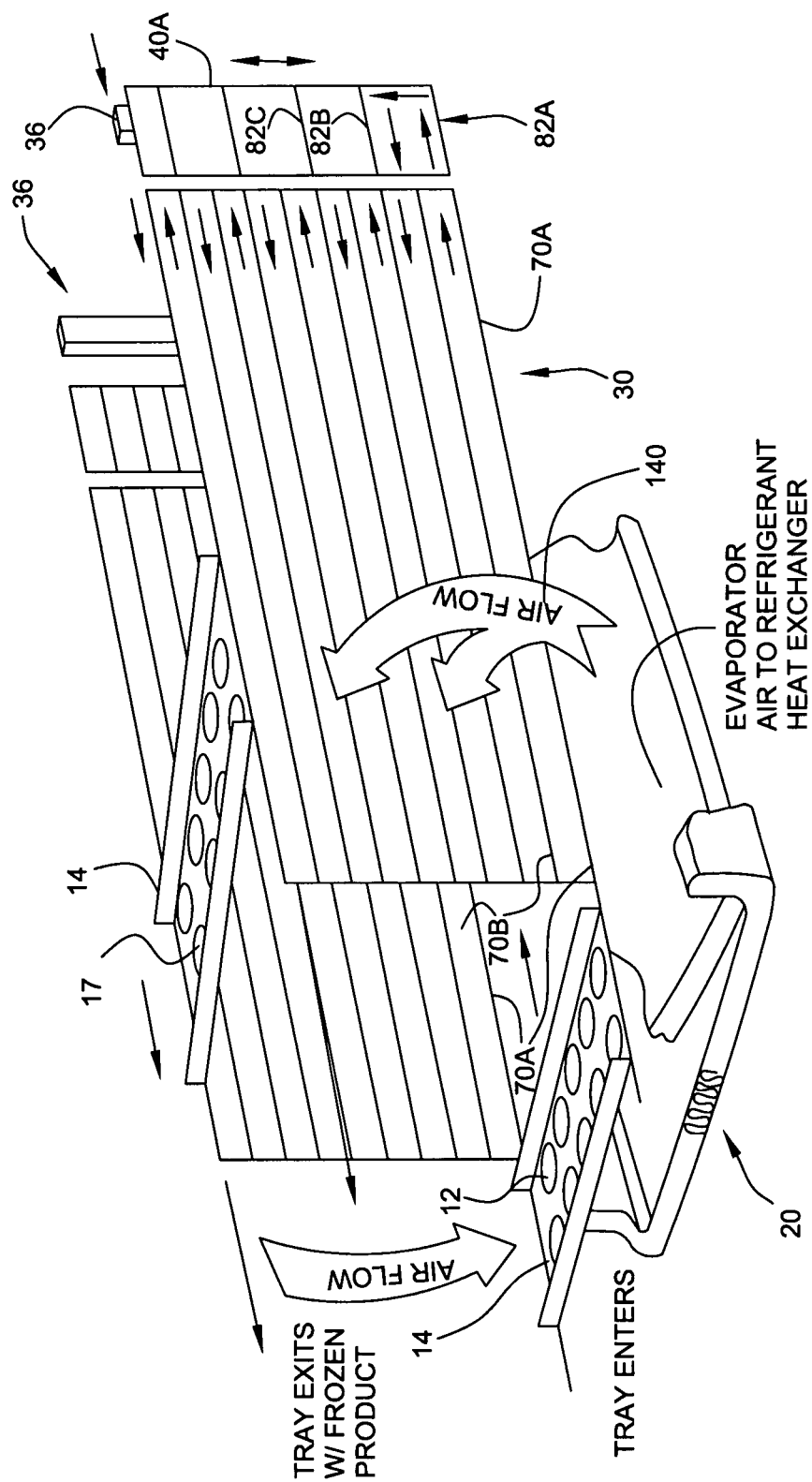
FIG. 8 is a schematic view of the constructions of the interior of the freezer enclosure showing the evaporator component of the refrigeration system, the multiple levels of tray guides, the elevator at one end, and a tray advancement or pusher mechanism for advancing trays off of the elevator and onto the levels of the tray guides.

As shown in the FIGS. 5, 6 and 8, the elevator mechanism 40 is constructed with a plurality of levels 82 and operates in conjunction with the tray advancement mechanism 36 to receive more than one tray simultaneously and transport each of such trays to an adjacent level.

Figure 10:
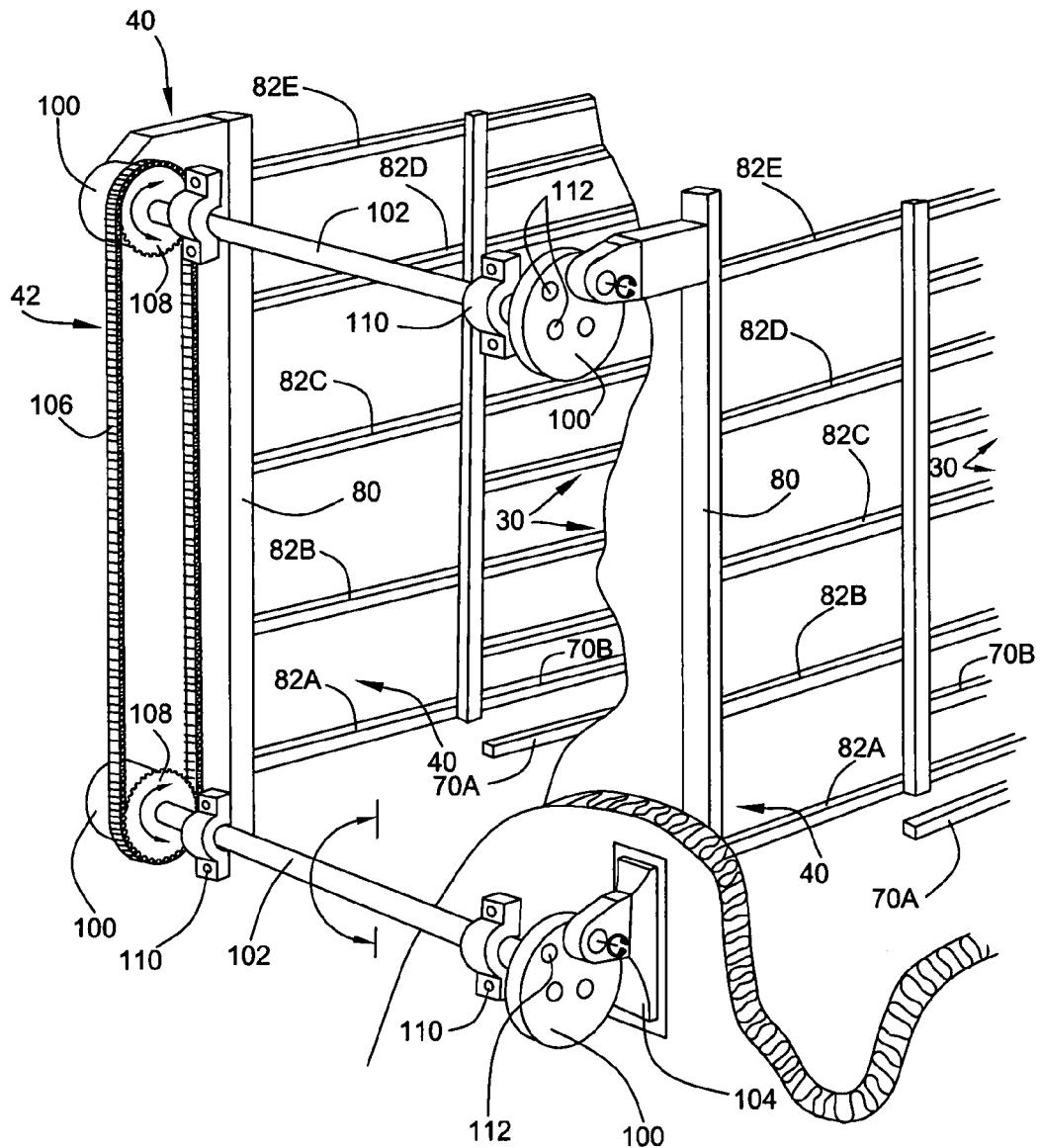
FIG. 10 is an isolated, perspective view of one example of the elevator mechanism.

With reference to FIGS. 6 and 10, the elevator mechanism 40 in this example includes a drive system indicated generally at 42 which moves the elevator up and down by a 180 deg rotation of four eccentric cams 100 affixed to shafts 102 which are preferably located exterior of the freezer enclosure 20, that is, outside of the low temperature part of the tunnel freezer. The cams are isolated from the freezer by a low temperature boot 104. The drive system includes a motor (not shown) engaging a chain 106 which drives sprocket 108 to rotate the cams 100. Bearings 110 in FIG. 10 provide support for the shafts 102. Different cam positions 112 are provided in the cams 100 at different radiuses to provide for more or less vertical travel to the elevator 40 to thereby adjust the amount of vertical travel of the elevator and accommodate different product gap (spacing required between adjacent levels) and concomitant rail adjustments. One advantage of this design is that the elevator 40 travel becomes primarily horizontal as it rails 82A, 82B, etc. approach alignment with rails 70A, 70B of the tray guides 30. Other mechanisms such as vertical rams or individual mechanical mechanisms for level of rails in the tray guides 30 could accomplish similar results. The design of FIG. 10 allows the temperature-sensitive portions of the elevator mechanism, such as the motor, chain 16 and cams 100 to be located outside of the low temperature portion of the tunnel freezer (5) and also minimizes space requirements at the end of the freezer (4).

The tray advancement mechanism 36 engages with and moves a tray out of the elevator, as shown in FIG. 8. The tray advancement mechanism is nested within or may be separate from the elevator 40. The tray advancement mechanism includes a drive system shown generally at 44 in FIG. 9. The drive system 44 has sufficient force behind it that it can move all of the trays approximately one-tray width horizontally along the tray guide system 30 when the tray guides 30 are fully loaded with trays. The tray advancement mechanism 36 and its drive system 44 are shown isolated in FIG. 9. The tray advancement mechanism drive system 44 includes a cable and chain mechanism 120 which is designed to advance a pair of vertically-oriented bars 122 one tray width as indicated by arrows 124. The bars 122 engage with and push the sides of the trays 14 as shown in the Figure. The bars 122 are coupled at their top and bottom to cables 126 which are supported on rollers 128. A motor 130 operates to rotate a pair of shafts 132 which causes a chain 132 to travel around its sprockets 134; rotation of the chain and sprockets 134 causes the cables 126 to move the bars 122 back and forth. The rollers 128 and sprockets 134 are mounted to fixed structures exterior to the enclosure 20 so as keep the motor, chain and cables exterior to the enclosure 20 to the extent possible. Many other mechanical mechanisms including rams, actuators, rack and pinion and scissor actuators could be used.

FIG. 8 is a schematic view of the constructions of the interior of the freezer enclosure 20 showing the refrigeration system in the form of an air to refrigerant heat exchanger evaporator 72 placed below the tray guides 30. The refrigeration system includes fans (not shown) which operate to blow air in a circular path transverse to the direction of travel of the trays through the enclosure, as indicated by the arrows 140. FIG. 8 also shows one of the elevators 40 and the associated tray advancement mechanism 36 for advancing the trays off the elevator onto the associated levels of the tray guides.

FIG. 11 is a plan view of the interior of the freezer showing first level of the freezer enclosure 20. The tray 14 enters the opening 53 at the lower right hand corner of the enclosure 20 and is inserted onto the rails 82A defining the lowest level of the elevator 40B. The tray advancement mechanism 36 includes the two pusher bars 122 which push the tray 14 off of the rails 82a and onto the lowest level 70a of the tray guides 30. The tray guides 30 include supports 150 which space the levels away from the interior wall of the freezer enclosure as shown. The tray guides further may include vertical supports or a suitable frame structure attached to the enclosure to support the weight of the rails and the product trays. An evaporator and fans are positioned below the first level but are not shown in the Figure. As the trays is successively advanced along the first level it is eventually pushed onto the rails 82A of the first level of the elevator 40A at the opposite end of the freezer enclosure. The elevator 40A lifts the tray to the second level and the pusher bars 122 push the tray onto the second level (not shown in the Figure).

FIG. 12 is a plan view of the top level of the freezer enclosure 20. In the illustrated configuration there are an even number of levels to the tray guides 30 and the elevator 40A lifts a tray 14 to the top rail level 70F and the pusher mechanism bars 122 push the tray 14 off of the elevator rails 82E onto the top rail level 70F. The tray is eventually pushed to the end 26 and onto the top level 82E of the elevator 40B. A tray eject mechanism consisting of a pusher bar 160, motor 162 and shafts 164 connecting the motor to the pusher bar 160 pushes the tray off of the elevator onto a tray eject conveyor or slide 50D where it is conveyed to an exit zone for unloading of the tray.

Depending on the configuration of the elevators and the tray guides the exit end of the uppermost level in the freezer enclosure may or may not be a part of the elevator.

FIG. 13 shows one possible arrangement of an embodiment in which the refrigeration system is included within the enclosure. The freezing tunnel or enclosure 20 is an insulated low temperature enclosure of conventional construction or an insulated enclosure such as a refrigerated shipping container or truck trailer, or insulated structure assembled from commercially available insulated panels as a kit. An air to refrigerant heat exchanger 72 is located diagonally across the bottom of the enclosure maximizing the heat exchanger face area, or in some other location as space and design dictate. The upper corner 75 of the heat exchanger 72 in this example would be in close proximity to the underside of freezing trays 14 to maximize the air being blown by fan(s) 74 across the product trays 14. The arrangement of the fans 74, evaporator 72, trays 14 and rail system (tray guides 30) would form a plenum 200 that substantially contains and directs all of the airflow over the product carrying trays 14, as indicated by the arrows in FIG. 13. The rail system 30 and elevator would be adjustable to accommodate different product thicknesses and also optimize airflow.

FIG. 14 is another view of the interior of the freezer enclosure 20 between the ends thereof showing an alternative arrangement for the tray guides 30, evaporator 72 and fans 74.

The refrigeration system has a pair of air-cooled condensers 204 positioned in the upper corners of a standard shipping container exterior of the insulated enclosure 20. The air-cooled condensers are within the "envelope" of the dimensions of a standard shipping container and do not protrude outside of the envelope, allowing the entire unit to be transported in a stacked condition with other containers aboard a ship or transported in a standard rail car or truck adapted for transporting shipping containers. The air-cooled condensers condense and supply liquid refrigerant to an evaporative heat exchanger 74 that extends in a longitudinal direction down the length of the interior of the enclosure 20. A fan 74 circulates air through the enclosure transverse to the longitudinal axis of the enclosure and through the fins of the evaporator 72. The air-cooled condensers 204 include fans 600 that direct air from apertures (not shown) in the sides of the container through the condensers and out the top of the container as shown in my prior patent, FIG. 27. Insulated walls 601 separate the chilled interior of the enclosure 20 from the relatively warm air adjacent to the fan 600 and condenser 204.

The design of FIG. 14 allows an air-cooled condenser to be incorporated within the envelope of a standard shipping container without decreasing evaporator space or freezing capacity. The benefits include portability and a system that can be completely self-contained, requiring no field assembly. All that is required is a source of electrical power for the machinery in the cooling system, including the fans 74, 600. It will be appreciated that the additional components for the refrigeration system shown in FIGS. 13 and 14 is not shown, but will be provided either elsewhere in the enclosure 10, such as in machinery space provided in a portion of the enclosure or exterior of the enclosure 20.

Figure 9:
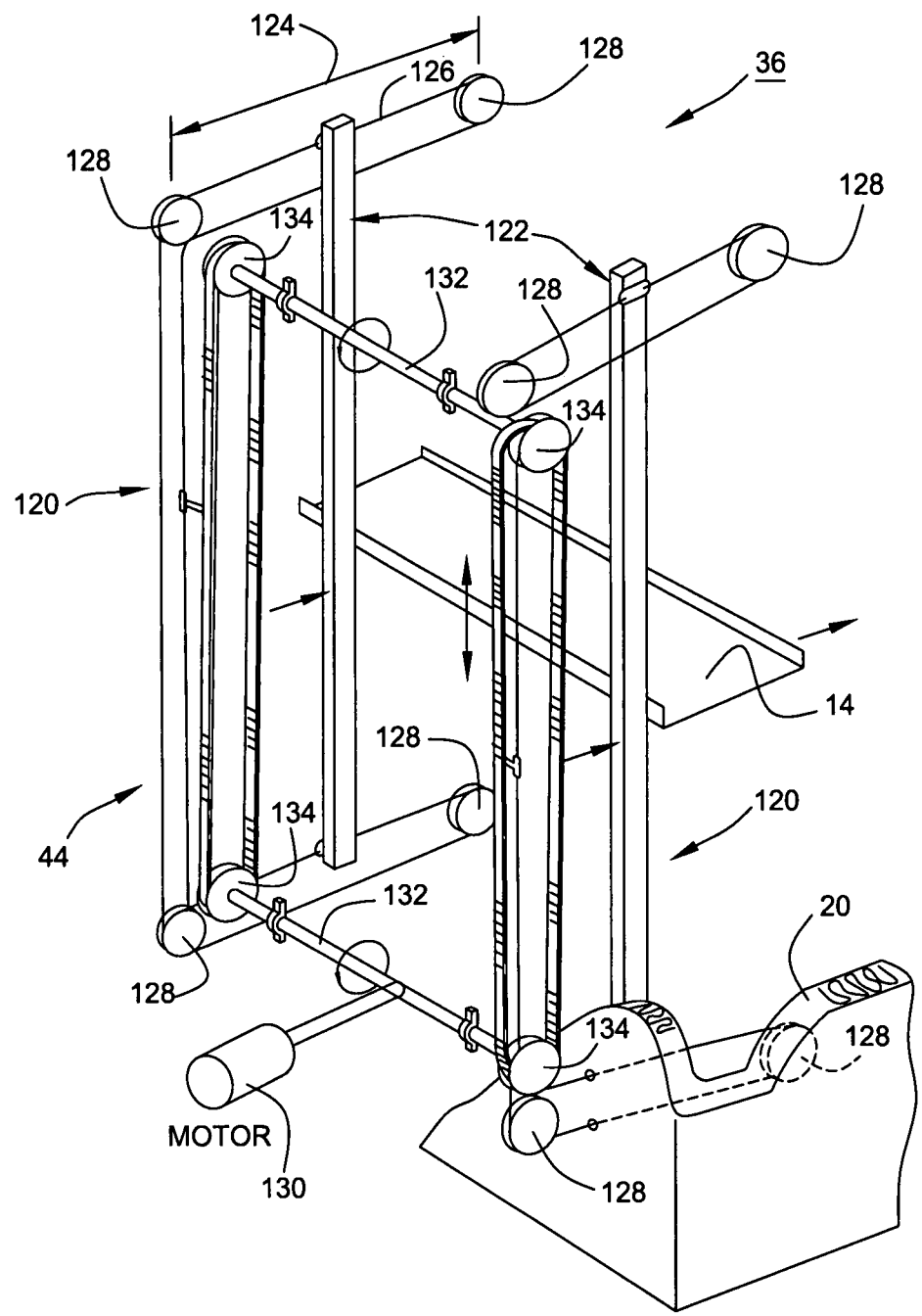
FIG. 9 is an isolated, perspective view of one example of a pusher mechanism which advances the trays off of the elevator onto the tray guides.

FIG. 15 is a cross-sectional view through the insulated enclosure 20 showing another arrangement of a refrigeration system. A set of evaporative heat exchangers 72 are mounted to the upper portion of the enclosure 20 above the trays 14 and extend along substantially the entire length of the insulated enclosure between the ends thereof. The evaporators preferably have a high capacity to depth ratio, as described in my prior patent. This is indicated in FIG. 9 by the width of the evaporator 72 in the direction transverse to the airflow being much larger than the thickness or depth of the evaporator, and the fact that the evaporator 72 has a longitudinal extent either most of the entire length of the enclosure, or substantially the entire length of the enclosure 20.

The evaporators 72 are positioned in a diagonal fashion so as to take up a minimum of space in the enclosure 20 and allow the tray guides to carry as many trays 14 and product as possible. A set of fans 74 are spaced along the length of the enclosure adjacent to the evaporators, one of which is shown in FIG 15. The fans are mounted to the upper region of the enclosure in any convenient manner. The fans circulate air in a manner generally orthogonal to the longitudinal axis of the insulated enclosure in the direction indicated by the arrows. The air flows through the interior of the evaporative heat exchanger 72, where heat from the air is absorbed by the fins in the heat exchanger. The air blows down the side of the enclosure and across the product, loaded on the trays 14. The trays 14 can be spaced relative to each other to equalize the flow of air across the trays (e.g., by separating the trays more in the bottom portion of the enclosure as compared to the top portion). The number of heat exchangers to place within the enclosure, their size and cooling capacity are all design details that will vary depending on the cooling requirements of the given situation. Persons skilled in the art will be able to account for these factors and arrive at a suitable arrangement for the heat exchangers and the fans.

With reference to the embodiment of FIG. 15, diagonally oriented evaporator 72 forms triangular air plenums 170 and 172 above and below the evaporator 72. One edge 174 of the evaporator 72 is close to or in contact with the enclosure 20 along its longitudinal extent, substantially blocking the airflow around that edge 174. Another longitudinal edge 176 is in close proximity to a product carrying tray and a distance away from the enclosure wall at 178, thereby creating an airflow path around that edge 176 of the evaporator 72. When product trays are used to carry product through the enclosure, airflow passages 200 are left open between the product and the sides of the enclosure 20.

When an air moving means such as fans 74 are used to move air through the air plenums and passages 170, 172, 200, such moving air is confined to a path where it is caused to pass through the evaporator 72 where it is cooled, while transferring heat to the coolant within the heat exchanger tubes 184. When the air is moved through the product the air is warmed by absorbing heat from the product and this heat is removed by the evaporator. The air flow is preferably substantially transverse to the direction of travel of the trays through the enclosure 20. As shown in FIGS. 13-15, the tray support features or guides 30 are positioned in a spaced apart relationship relative to the opposite sides of the enclosure to thereby define air plenums 200 to the sides of the trays 14 as they advance through the enclosure 20.

Air is delivered to the full face area of the evaporator (longitudinal length of the evaporator multiplied by the height, or distance between the edges 174 and 176). Similarly, the air is delivered to the area of the product to be frozen as represented by the side of the tray adjacent to the air passage 200.

From the above description, it will be appreciated that a method for continuous production of frozen comestibles has been described comprising the steps of successively advancing trays 14 carrying comestibles to be frozen into an insulated enclosure 20 at an entrance 53 located at an entrance end 26 thereof such that a first level 70A of the enclosure extending from the entrance to an opposite end 28 of the enclosure is filled with trays 14 in an abutted relationship; advancing a tray 14 from the first level 70A at the opposite end from the entrance end onto an elevator mechanism 40A simultaneous with the advancement of a further tray 14 at the entrance 53 due to the trays having an abutted relationship within the enclosure along the first level; carrying the tray 14 advanced onto the elevator 40A to an adjacent second level 70B of the enclosure 20 extending between entrance end 26 and the opposite second end 28; continuing to advance trays 14 into the entrance, operating the elevator 40A and advancing trays along both the first and second levels to fill the first and second levels of the enclosure with trays in an abutted relationship; continuing to advance trays 14 into the entrance 53, operating the elevator 40A and a second elevator mechanism 40B proximate to the entrance end and advancing trays along the first and second levels and successive levels of the enclosure until all the levels in the enclosure are filled with trays in an abutted relationship. Thereafter, the method includes the step of continuing to advance a tray into the entrance 53 and withdrawing a tray carrying frozen comestibles from an exit 54 of the enclosure to thereby provide a continuous production of frozen comestibles.

In one embodiment, the insulted enclosure 20 includes at least five levels and wherein the elevator mechanism at the entrance and opposite ends operates to transport more than tray simultaneously to an adjacent level.

In one configuration, the tray guides include features for customizing the vertical separation between adjacent levels.

The features could be simply features in the supports for the rails allowing the rails to be positioned at different heights. The elevators are adjusted to match the spacing between rails.

In one embodiment, the insulated enclosure takes the form of a modified shipping container adapted to be transported from place to place. In other embodiments the enclosure is fixed.

As shown in FIGS. 1-3, the method may also include the step of continuously circulating trays after ejection from the enclosure in a closed loop to a product unloading station, a cleaning station, a product loading station, and back into the enclosure.

In another aspect, a freezing system for continuous production of frozen comestibles carried by trays has been described including an insulated enclosure 20 having a first end 26 and a second end 28, tray guides 30 positioned within the enclosure receiving the trays 14 and defining two or more levels 70 for travel of trays through the enclosure between the first and second ends in an abutted relationship, a refrigeration system providing cold air to said enclosure to thereby freeze the comestibles (which may be either internal or external to the enclosure 20), a tray advancement mechanism 36 for advancing trays longitudinally along the tray guides in the two or more levels, the trays advanced along the guides in an abutted relationship; and one or more elevator mechanisms 40 for advancing trays from one level to another level within the enclosure. The one or more elevator mechanisms 40 and the tray advancement mechanism 36 operate in a synchronized manner such that trays are successively advanced into the enclosure to fill all levels until the tray guides 30 are completely filled with trays, and wherein thereafter for every tray 14 entering the enclosure 20 a tray 14 exits the enclosure carrying frozen comestibles, thereby providing a continuous production of frozen comestibles.

As shown in FIG. 12, the system may include an ejection mechanism 160 for ejecting a tray of frozen comestibles from the exit opening 54.

In another aspect, a freezer enclosure 20 has been described comprising a superstructure having interior side walls (FIGS. 13-15), the superstructure defining a longitudinal axis 56 (FIG. 3), a plurality of tray guides 30 incorporated into the interior of the superstructure and spaced from the side walls, wherein opposed pairs of the tray guides form a guide for guiding a tray through the interior of the superstructure, and wherein the tray guides are provided so as to form a multitude of levels (FIGS. 8, 10), a first elevator 40A at a first end of the enclosure and a second elevator 40B at a second end of the enclosure, the elevators for moving trays from one level to another, a first pusher mechanism 36 at the first end and a second pusher mechanism 36 at the second end of the enclosure, the pusher mechanisms for pushing a tray out of the elevator and onto a level of the tray guides; and an entrance 53 for trays entering the enclosure and an exit 54 for trays exiting the enclosure. Individual elevators and pusher mechanisms at each level are an option.

In one embodiment, the enclosure takes the form of a modified shipping container. The tray guides may take the form of rollers or rails. As shown in FIG. 7 the rails may take the form of a metal guide rail 90 and a low friction material 92 receiving a peripheral portion 96 of the tray 14.

In yet another aspect of the invention, it will be understood that a freezer cell has been described including an insulated enclosure 20, tray guides 30 mounted within the enclosure defining a plurality of levels for travel of trays, and at least one elevator 40 adapted for receiving simultaneously at least two trays at least two levels in the plurality of levels and transporting said at least two trays vertically to adjacent levels in the plurality of levels (see FIG. 5), and a pusher mechanism 36 for simultaneously pushing the at least two trays out of the elevator onto the tray guides at the adjacent levels.

Other Variations.

In one possible configuration, the system includes an optional entrance vestibule designed as a pre-chilling station where moisture from the product and initial cool-down of the product and tray is performed in order to minimize frost build-up in the enclosure 20. The entrance vestibule could be either external or internal to the enclosure. Trays loaded with product are continually placed in the entrance vestibule, first in first out, and remain there for a configurable dwell time. A fan and one or more evaporators are provided in the entrance vestibule. Air cooled by the evaporator(s) blows over the trays and product within the entrance vestibule and lowers the temperature of the tray and product, and removes frost-forming moisture from the product. An optional air inlet bleed vent or pump is provided to the entrance vestibule to create positive air pressure within the entrance vestibule relative to the outside environment. Similarly, the entire enclosure could be placed under positive air pressure by means of an air inlet bleed. In alternative arrangements, this embodiment can take advantage of the entrance vestibule design including air lock door as disclosed in my prior patent.

In an embodiment in which the enclosure 20 is built around a standard 40 or 45 foot shipping container, the shipping container is modified to add a layer of insulation inside the floors, walls and roof of the container, thereby forming the insulated enclosure 20. A bulkhead can be installed in the container to separate the refrigerated space from a space designed to accommodate the refrigeration machinery.

In another variation, as shown in FIG. 16, the insulated enclosure 20 could be constructed as a double freezing system to two entrances (Entrance 1 and Entrance 2), two sets of tray guides 30A and 30B, and two exits (Exit 1 and Exit 2). The design has a centrally-located evaporator 72. The fans (not shown) positioned within the enclosure 20 circulate air in a transverse manner through the evaporator and then the first set of tray guides 30 between the trays 14, and the air deflects off the wall 32A upwardly (or downwardly, depending on the configuration), and circulated across the top (or bottom) of the enclosure and then off the opposite wall 32B and back through the second set of trays guides 30 and associated trays. The trays 14 move independently one exiting the enclosure 20. The external tray conveying system supplies the trays to the entrances and receives trays from the exits as disclosed in the previous embodiments. Each of the sets of tray guides includes multiple levels as explained above and use elevator mechanisms to transport trays from one level to another as explained previously and pusher mechanisms to advance the trays off the elevators. The entrance and exit are shown in FIG. 16 at opposite ends but of course they could enter and exit at the same end or intermediate the ends. In one particular configuration the tray guides are passive (e.g., rails or rollers) positioned within the enclosure and define two sets of multiple levels of travel of the trays, each set including at least a first, a second and a third level for travel of trays. The trays sequentially traveling along the guides from the entrances and then along the first, second and third levels within the enclosure and then out the exit. While a "double" freezing system is shown in FIG. 16, the concept can be extended to a freezing enclosure with three or more lanes or essentially any number of lanes desired, with the number depending on such factors as the width of the enclosure, the size of the trays, and the refrigeration capacity of the refrigeration system. With three or more lanes, it may be necessary to add additional evaporators and fans to provide sufficient cooling capacity in order to freeze the product within the total dwell time of the product within the enclosure.

In another variation, as shown in FIG. 17 the tray guides 30, evaporator 72 and fans 74 are manufactured as a separate subassembly, with vertical and horizontal supports for the tray guides, evaporator and fans as necessary, in order to provide a module which can be inserted as a unit into a standard insulated shipping container, truck trailer or other type of insulated enclosure and bolted into place within the enclosure. For example, the evaporator and fans could be positioned below the tray guides and bolted to the tray guides or supporting structure or frame for the tray guides, and the subassembly of tray guides+evaporator+fans is then inserted as a unit into the enclosure and fastened to the enclosure's interior walls or superstructure. The subassembly of tray guides 30, evaporator 72 and fans 72 includes multiple levels of rails, rollers, or other passive structures, and thereby provide for a passive system for supporting multiple levels of product trays as described above. The subassembly could further include the elevators and/or the pusher mechanism for pushing the trays off of the elevators. In one variation, the tray guides 30 are constructed as one insert module and the evaporator 72 and fans 74 are constructed as a second insert module. The two modules are inserted into the insulated enclosure, bolted into place and then the elevator and pusher mechanisms installed into the enclosure to complete the system.

Additionally, while in the appended drawings the mechanical system 44 for raising and lowering the elevators 36 is shown positioned to the side of the elevator on the ends of the enclosure, it would be possible to position the mechanical system 44 for the elevators 36 either above or below the enclosure, such as by mounting the mechanical system 44 to the roof of the enclosure 20 or positioning the mechanical system below the floor of the enclosure 20.

The refrigeration system can take a variety of forms including the various configurations described in my prior patent. For example, the refrigeration system may also supply cold air to adjacent packing or storage locations for product after it has exited from the freezing enclosure. The term "refrigeration system" as used herein and in the claims refers to any system which serves to provide cold air to the enclosure and thereby freeze the comestibles. The refrigeration system can be either internal or external to the enclosure. For example, the term "refrigeration system" may encompass an evaporator and fans placed within the enclosure. As another example the term "refrigeration system" may encompass an external refrigeration system which supplies cold air to the enclosure.

The term "tray" as used herein is intended to encompass any discrete passive structure or unit which supports or carries product to be frozen, such as for example a flat tray with raised sides, a wire basket, or the like, and which can be inserted into and removed from the insulated enclosure. The tray can be made from any suitable material and need not be metal.

While a number of exemplary aspects and embodiments have been discussed above, those of skill in the art will recognize additional modifications, permutations, additions and sub-combinations thereof as also being present. It is therefore intended that the following appended claims and claims hereafter introduced are interpreted to include all such modifications, permutations, additions and sub-combinations as are within their true spirit and scope.

I claim:

1. A freezing system for continuous production of frozen comestibles, comprising:
a plurality of trays for carrying comestibles to be frozen;
an insulated enclosure having a first end and a second end;
passive tray guides positioned within the enclosure receiving the trays and defining two or more levels for travel of trays through the enclosure between the first and second ends in an abutted relationship,
a refrigeration system providing cold air to the enclosure to thereby freeze the comestibles;
a tray advancement mechanism inserting successive trays into the enclosure and for advancing the trays longitudinally along the passive tray guides in the two or more levels, the trays advanced along the guides in an abutted relationship;
first and second multiple-level elevators at opposite ends of the insulated enclosure for advancing trays from one level to another level within the enclosure, each of the first and second elevators configured to receive trays at more than one level simultaneously;
wherein the first and second multiple-level elevators and the tray advancement mechanism operate in a manner such that trays are successively advanced into the enclosure to fill all levels until the tray guides are substantially filled with trays, and wherein thereafter for every tray entering the enclosure a tray exits the enclosure carrying frozen comestibles, thereby providing a continuous production of frozen comestibles.

2. The system of claim 1, wherein the tray guides comprise rails.

3. The system of claim 1, further comprising an ejection mechanism for ejecting a tray of frozen comestibles from the exit opening.

4. The system of claim 1, wherein the freezing system is configured and adapted for freezing of a sea food.

5. The system of claim 1, wherein each of the first and second elevators further comprises adjustable means for adjusting the amount of vertical travel of the elevator. located exterior of the insulated enclosure.

6. The system of claim 2, wherein the rails comprise a metal guide rail and a low friction material.

7. The system of claim 6, wherein the metal guide rail comprises extruded aluminum and wherein the low friction material comprises an ultra high molecular weight (UHMW) plastic.

8. The system of claim 6, wherein the metal guide rail is configured with a profile which has a height which is less than the combined height of the tray and comestibles to be frozen placed on the tray.

9. The system of claim 6, wherein the insulated enclosure comprises a modified shipping container.

10. A freezer enclosure comprising:
a structure having interior side walls and defining a longitudinal axis;
a plurality of passive tray guides incorporated into the interior of the structure and spaced from the side walls, wherein opposed pairs of the passive tray guides form a guide for guiding a tray through the interior of the structure, and wherein the tray guides are provided so as to form a multitude of levels;
a first multiple-level elevator at a first end of the enclosure and a second multiple-level elevator at a second end of the enclosure, the elevators at the first and second ends for moving trays from one level to another, each of the first and second multiple-level elevators configured to receive trays at more than one level simultaneously;
one or more pusher mechanisms at the first end of the enclosure and one or more pusher mechanisms at the second end of the enclosure, the pusher mechanisms for pushing a tray out of the levels of the first and second multiple-level elevators containing trays simultaneously and onto a corresponding level of the tray guides, the pusher member causing the trays in the corresponding levels to advance down the tray guides in an abutted relationship; and an entrance at the first end for trays entering the enclosure and an exit for trays exiting the enclosure.

11. The freezer enclosure of claim 10, wherein the enclosure comprising a modified shipping container.

12. The freezer enclosure of claim 10, wherein tray guides comprise rollers.

13. The freezer enclosure of claim 10, wherein the tray guides comprise rails.

14. The freezer enclosure of claim 13, wherein the rails further comprise a metal guide rail and a low friction material receiving a peripheral portion of the tray.

15. A freezer cell comprising:
an insulated enclosure;
passive tray guides mounted within the enclosure defining a plurality of levels for travel of trays, and
at least one elevator adapted for receiving simultaneously at least two trays at least two levels in the plurality of levels and transporting said at least two trays vertically to adjacent levels in the plurality of levels, and
a pusher mechanism for simultaneously pushing the at least two trays out of the elevator onto the tray guides at the adjacent levels.

16. The freezer cell of claim 15, wherein the cell further comprises two elevators.

17. The freezer cell of claim 15 wherein the elevator further comprises a drive mechanism for the elevator which is positioned exterior of the insulated enclosure.

18. The freezer cell of claim 15, wherein the drive mechanism further comprises a means for adjusting the amount of vertical travel of the elevator.

* * * * *